US011244018B2

(12) United States Patent
Bouchard et al.

(10) Patent No.: US 11,244,018 B2
(45) Date of Patent: *Feb. 8, 2022

(54) METHODS AND SYSTEMS FOR VALIDATING ONLINE TRANSACTIONS USING LOCATION

(71) Applicant: BCE INC., Verdun (CA)

(72) Inventors: Jean Bouchard, Sillery (CA); Stephane Maxime Francois Fortier, Breakeyville (CA)

(73) Assignee: BCE INC., Verdun (CA)

( * ) Notice: Subject to any disclaimer, the term of this patent is extended or adjusted under 35 U.S.C. 154(b) by 146 days.

This patent is subject to a terminal disclaimer.

(21) Appl. No.: 16/688,383

(22) Filed: Nov. 19, 2019

(65) Prior Publication Data

US 2020/0233912 A1    Jul. 23, 2020

Related U.S. Application Data

(63) Continuation of application No. 12/298,720, filed as application No. PCT/CA2007/001152 on Jun. 27, 2007, now Pat. No. 10,482,081.

(Continued)

(51) Int. Cl.

| G06F 16/9535 | (2019.01) |
|---|---|
| H04W 4/02 | (2018.01) |
| H04L 29/08 | (2006.01) |
| G06Q 30/02 | (2012.01) |
| G06Q 40/00 | (2012.01) |
| G06F 16/24 | (2019.01) |
| G06Q 20/02 | (2012.01) |
| G06Q 20/10 | (2012.01) |
| G06Q 20/40 | (2012.01) |
| H04L 29/06 | (2006.01) |

(52) U.S. Cl.
CPC ......... *G06F 16/9535* (2019.01); *G06F 16/24* (2019.01); *G06Q 20/02* (2013.01); *G06Q 20/10* (2013.01); *G06Q 20/40* (2013.01); *G06Q 30/0251* (2013.01); *G06Q 30/0253* (2013.01); *G06Q 30/0254* (2013.01); *G06Q 30/0255* (2013.01); *G06Q 30/0264* (2013.01); *G06Q 30/0269* (2013.01); *G06Q 30/0277* (2013.01); *G06Q 40/00* (2013.01); *G06Q 40/12* (2013.12); *H04L 63/0892* (2013.01); *H04L 67/02* (2013.01); *H04L 67/10* (2013.01); *H04L 67/306* (2013.01); *H04W 4/023* (2013.01)

(58) Field of Classification Search
None
See application file for complete search history.

(56) References Cited

U.S. PATENT DOCUMENTS

2003/0172036 A1* 9/2003 Feigenbaum ......... G07F 7/1083
705/64

* cited by examiner

*Primary Examiner* — Jason Borlinghaus

(57) ABSTRACT

A method comprising: obtaining a service point location, the service point location being associated with a logical identifier assigned to end-user equipment used in an attempt to make an online transaction; obtaining at least one authorized transaction point location, the at least one authorized transaction point location being associated with transaction object information provided via the end-user equipment; comparing the service point location to each of the at least one authorized transaction point location; and performing an action related to validation of the online transaction based on a result of the comparing. Also provided is an apparatus for implementing this method.

21 Claims, 9 Drawing Sheets

Related U.S. Application Data

(60) Provisional application No. 60/941,830, filed on Jun. 4, 2007.

METHODS AND SYSTEMS FOR VALIDATING ONLINE TRANSACTIONS USING LOCATION

CROSS-REFERENCE TO RELATED APPLICATION

The current application is a Continuation of U.S. patent application Ser. No. 12/298,720, filed Oct. 27, 2008, which is a National Phase entry of International Application No. PCT/CA2007/001152, filed Jun. 27, 2007, which claims priority from U.S. Provisional Application 60/941,830, filed Jun. 4, 2007, all of which are incorporated by reference herein in their entirety.

FIELD OF THE INVENTION

The present invention relates generally to online transactions and, more particularly, to methods and systems for validating online transactions using location information.

BACKGROUND

Electronic commerce (e-commerce) and online transactions are now widely used. One common type of online transaction involves an electronic payment by a first party to a second party, for example, to purchase goods or services. This electronic payment is typically effected by the first party entering payment card information (e.g., credit card information or debit card information) at his/her computer. Information pertaining to the online transaction attempted to be made, including the entered payment card information, is normally encrypted and transmitted over a public computer network (e.g., the Internet) and a financial network to different computers (e.g., a payment gateway, an acquiring bank's processor, a card issuing bank's server) which process this information in order to approve or deny the online transaction. Approval or denial of the online transaction is communicated to the first party via his/her computer and, if approved, settlement of the online transaction takes place between the first party's card issuing bank and the second party's acquiring bank. While computer networking makes online transactions convenient and efficient, it also creates potential for fraud and thus one major area of interest with online transactions is fraud prevention. Accordingly, various security measures have been implemented to counter fraudulent online transactions. Examples of such security measures include data encryption, card security code (CSC) verification where an individual attempting to make an online transaction using a payment card is asked to enter the payment card's CSC, and address verification systems (AVS) where an address entered by an individual attempting to make an online transaction using a payment card is compared to a billing address known to the payment card's issuing bank.

Although these and other security measures help to reduce the potential for fraud, they do not entirely remove it due to factors such as identify theft, stolen or lost cards, etc. There thus exists a need for improvements directed to validating online transactions.

SUMMARY OF THE INVENTION

As embodied and broadly described herein, the present invention provides a method comprising: obtaining a service point location, the service point location being associated with a logical identifier assigned to end-user equipment used in an attempt to make an online transaction; obtaining at least one authorized transaction point location, the at least one authorized transaction point location being associated with transaction object information provided via the end-user equipment; comparing the service point location to each of the at least one authorized transaction point location; and performing an action related to validation of the online transaction based on a result of the comparing.

The present invention also provides an apparatus comprising an interface for receiving messages and a processing unit coupled to the interface. The processing unit is responsive to receipt of a message at the interface for: obtaining a service point location, the service point location being associated with a logical identifier assigned to end-user equipment used in an attempt to make an online transaction; obtaining at least one authorized transaction point location, the at least one authorized transaction point location being associated with transaction object information provided via the end-user equipment; comparing the service point location to each of the at least one authorized transaction point location; and performing an action related to validation of the online transaction based on a result of the comparing.

The present invention also provides a computer-readable medium storing a program element for execution by a computer. The program element comprises: first program code for causing the computer to obtain a service point location, the service point location being associated with a logical identifier assigned to end-user equipment used in an attempt to make an online transaction; second program code for causing the computer to obtain at least one authorized transaction point location, the at least one authorized transaction point location being associated with transaction object information provided via the end-user equipment; third program code for causing the computer to perform a comparison of the service point location to each of the at least one authorized transaction point location; and fourth program code for causing the computer to perform an action related to validation of the online transaction based on a result of the comparison.

The present invention also provides a method comprising: receiving a message conveying a logical identifier; consulting a database to obtain a service point location that is associated with the logical identifier; and using the service point location to perform an action related to validation of an online transaction attempted to be made using end-user equipment to which the logical identifier is assigned.

The present invention also provides an apparatus comprising an interface for receiving a message conveying a logical identifier and a processing unit coupled to the interface. The processing unit is operative for: consulting a database to obtain a service point location that is associated with the logical identifier; and using the service point location to perform an action related to validation of an online transaction attempted to be made using end-user equipment to which the logical identifier is assigned.

The present invention also provides a computer-readable medium storing a program element for execution by a computer. The program element comprises: first program code for causing the computer to receive a message conveying a logical identifier; second program code for causing the computer to consult a database to obtain a service point location that is associated with the logical identifier, and third program code for causing the computer to use the service point location to perform an action related to validation of an online transaction attempted to be made using end-user equipment to which the logical identifier is assigned.

The present invention also provides a method comprising: receiving a message conveying: (1) a logical identifier assigned to end-user equipment used in an attempt to make an online transaction; and (2) transaction object information provided via the end-user equipment; consulting a database to obtain at least one authorized transaction point location associated with the transaction object information; and verifying whether one of the at least one authorized transaction point location corresponds to a service point location associated with the logical identifier.

The present invention also provides an apparatus comprising: an interface for receiving a message conveying: (1) a logical identifier assigned to end-user equipment used in an attempt to make an online transaction; and (2) transaction object information provided via the end-user equipment; and a processing unit coupled to the interface. The processing unit is operative for: consulting a database to obtain at least one authorized transaction point location associated with the transaction object information; and verifying whether one of the at least one authorized transaction point location corresponds to a service point location associated with the logical identifier.

The present invention also provides a computer-readable medium storing a program element for execution by a computer. The program element comprises: first program code for causing the computer to receive a message conveying: (1) a logical identifier assigned to end-user equipment used in an attempt to make an online transaction; and (2) transaction object information provided via the end-user equipment; second program code for causing the computer to consult a database to obtain at least one authorized transaction point location associated with the transaction object information; and third program code for causing the computer to verify whether one of the at least one authorized transaction point location corresponds to a service point location associated with the logical identifier.

The present invention also provides a payment card comprising at least one card element conveying payment card information, the payment card information being associated with at least one authorized transaction point. The payment card information is usable to make online transactions at each of the at least one authorized transaction point and unusable to make online transactions at points other than the at least one authorized transaction point.

The present invention also provides a computer-readable medium storing information regarding a virtual transaction object, the information regarding the virtual transaction object being associated with at least one authorized transaction point. The information regarding the virtual transaction object is usable to make online transactions at each of the at least one authorized transaction point and unusable to make online transactions at points other than the at least one authorized transaction point.

These and other aspects of the invention will become apparent to those of ordinary skill in the art upon review of the following description of certain embodiments of the invention in conjunction with the accompanying drawings.

BRIEF DESCRIPTION OF THE DRAWINGS

A detailed description of embodiments of the present invention is provided herein below, by way of example only, with reference to the accompanying drawings, in which.

It is to be expressly understood that the description and drawings are only for the purpose of illustration of certain embodiments of the invention and are an aid for understanding. They are not intended to be a definition of the limits of the invention.

DETAILED DESCRIPTION OF EMBODIMENTS

Figure 1:
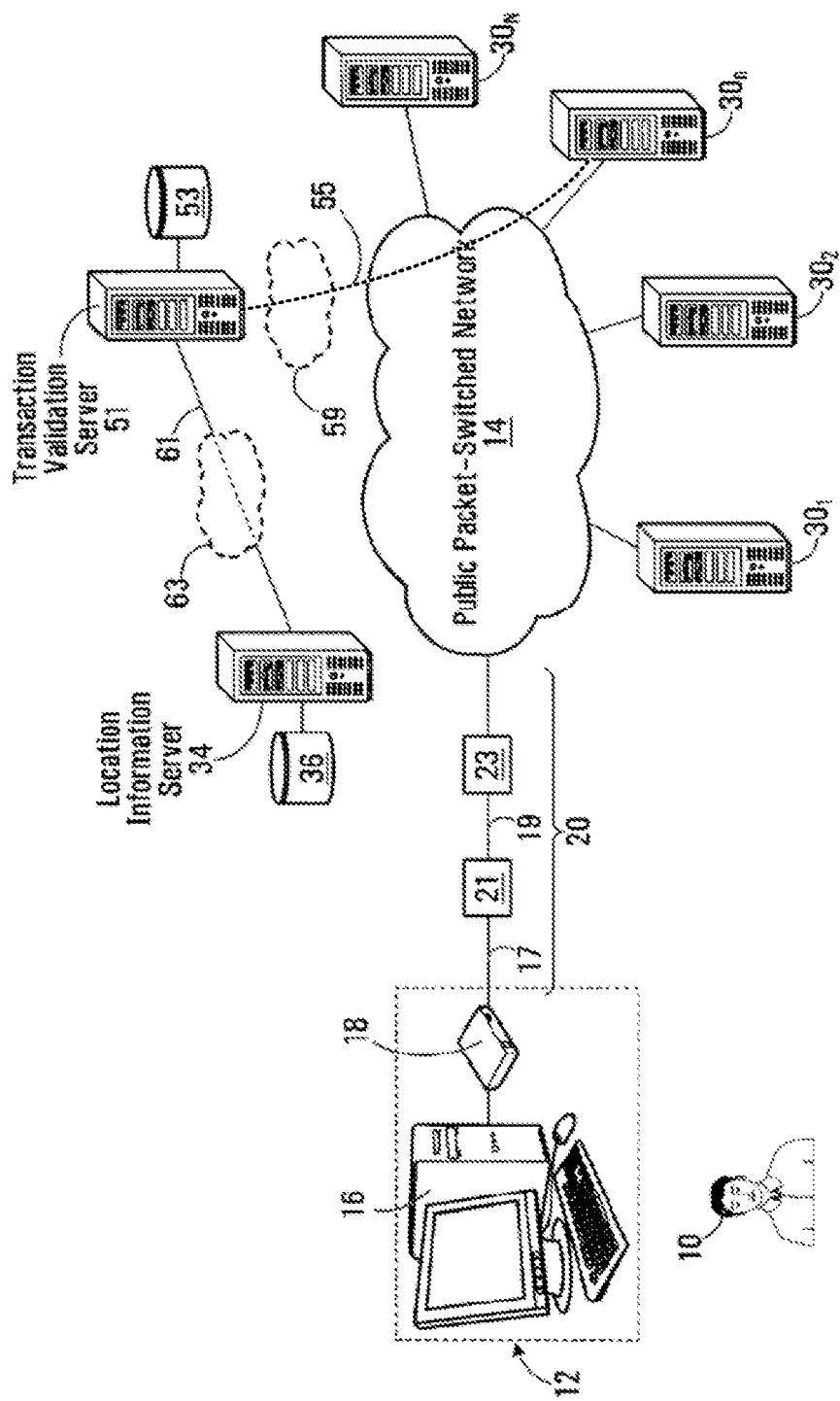
FIG. 1 shows an architecture allowing a user of end-user equipment connected to a public packet-switched network to access and interact with network sites of that network, for example, to make online transactions, in accordance with an embodiment of the present invention.

FIG. 1 depicts an architecture allowing a user 10 of end-user equipment 12 connected to a public packet-switched network 14 (e.g., the Internet) to access and interact with network sites (e.g., web sites) of that network, in accordance with an embodiment of the present invention.

In this embodiment, the end-user equipment 12 comprises a computing device 16 and a network interface unit 18. For example, the computing device 16 may be implemented as a personal computer (PC) such as a desktop computer, a laptop computer, or a tablet PC. The computing device 16 is provided with at least one input device such as a keyboard, a mouse, a touchscreen, a stylus, a microphone, etc., as well as a display and possibly one or more other output devices (e.g., speakers) that enable interaction between the user 10 and the computing device 16. The computing device 16 is operative to run a software application implementing a network browser (e.g., a web browser) with which the user 10 can interact via the display (and possibly one or more other output devices) and the at least one input device in order to access and interact with network sites of the public packet-switched network 14.

The network interface unit 18 enables the end-user equipment 12 to exchange data with the public packet-switched network 14 via a communication link 20. For example, in various embodiments, and depending on the nature of the communication link 20, the network interface unit 18 may be implemented as a modem such as a broadband modem (e.g., a digital subscriber line (DSL) modem or a cable modem) or a narrowband modem (e.g., a dial-up modem). Although it is shown as being a separate component in FIG. 1, the network interface unit 18 may be integrated into the computing device 16 (e.g., it may be a card internal to the computing device 16).

The communication link 20 may traverse one or more network elements and comprise one or more physical links and one or more logical links. For example, the communication link 20 may comprise a physical link 17 between the network interface unit 18 and a network element 21. The physical link 17 may comprise a copper twisted pair, a coax cable, an Ethernet link, a fiber optic link (e.g., fiber to the premises (FTTP)), a fixed wireless link, a satellite link, or a combination thereof. Depending on the nature of the physical link 17, the network element 21 may be a DSL access multiplexer (DSLAM), a cable modem termination system (CMTS), or another type of network element. The communication link 20 may also comprise a dedicated logical link 19 between the network element 21 and another network element 23 that provides access to the public packet-switched network 14. For instance, the network element 23 may be a network access server (NAS), a router, etc.

It will be appreciated that the communication link 20 may take on many forms in various embodiments.

While in this embodiment the end-user equipment 12 comprises the computing device 16 and the network interface unit 18, it will be appreciated that the end-user equipment 12 may comprise other components in other embodiments.

In order to exchange data with the public packet-switched network 14, the end-user equipment 12 is assigned a logical identifier. The logical identifier, which may be assigned to the computing device 16 or the network interface unit 18, may be an Internet Protocol (IP) address (e.g., in compliance with IPv4 or IPv6) or a proprietary address, label, or tag. The logical identifier may be statically assigned to the end-user equipment 12 in which case it does not change over time (e.g., a static IP address). Alternatively, the logical identifier may be dynamically assigned to the end-user equipment 12 in which case it may change over time (e.g., a dynamic IP address).

For example, the logical identifier may be assigned to the end-user equipment 12 by a network element that is part of the communication link 20 (e.g., the network element 23 in embodiments where it is a network access server). This network element may assign the logical identifier to the end-user equipment 12 when the end-user equipment 12 is activated (e.g., when the network interface unit 18 and/or the computing device 16 is/are powered-up) or otherwise regains network connectivity and/or at certain time intervals which may range from an hour or less to several months or more. For instance, in embodiments where the logical identifier is a dynamic IP address, the network element assigning the dynamic IP address to the end-user equipment 12 may do so in accordance with the Dynamic Host Configuration Protocol (DHCP) using a pool of IP addresses accessible to that network element. It will be recognized that assignment of the logical identifier to the end-user equipment 12 may be effected in various ways in various embodiments.

As mentioned previously, the user 10 can use the end-user equipment 12 to access and interact with network sites of the public packet-switched network 14. These network sites are implemented by servers $30_1 \ldots 30_N$ connected to the public packet-switched network 14. The servers $30_1 \ldots 30_N$ and the network sites that they implement are operated, managed or otherwise associated with various entities, including, for example, companies, governmental organizations, non-profit organizations, and individuals.

Each of the servers $30_1 \ldots 30_N$ comprises suitable hardware, firmware, software, control logic, or a combination thereof for implementing a plurality of functional components, including an interface and a processing unit. The interface of each of the servers $30_1 \ldots 30_N$ is adapted to receive messages from and send messages to communication equipment (such as the end-user equipment 12) connected to the public packet-switched network 14, as well as to receive data from or send data to other elements (e.g., computers or databases) communicatively coupled to that server but not necessarily connected to the packet-switched network 14. The processing unit of each of the servers $30_1 \ldots 30_N$ is adapted to effect various processing operations to implement that server's functionality.

Interaction of the user 10 with a network site implemented by a server $30_n$ ($1 \leq n \leq N$) typically involves the network browser implemented by the computing device 16 interacting with the server $30_n$ in order to allow the user 10 to view, hear or otherwise be exposed to content (e.g., web pages) of the network site via the display and/or one or more other output devices of the computing device 16, and possibly to input information (e.g., by entering text, selecting an option, etc.) and/or one or more commands (e.g., by clicking on a graphical button or a hyperlink) via the at least one input device of the computing device 16.

Occasionally, during his/her interaction with the network site implemented by the server $30_n$, the user 10 may desire or need to effect an online transaction. For example, and depending on the nature of the network site, the user 10 may desire or need to: purchase or otherwise obtain a product and/or a service offered on the network site; pay a bill for a previously obtained product or service via the network site; transfer funds from one account to another via the network site; buy or sell securities (e.g., stocks, bonds, etc.) via the network site; make a donation to a charity or other institution through the network site; etc. It will be appreciated that various other situations may arise in which online transactions may be desired or may need to be effected.

In attempting to effect an online transaction as part of his/her interaction with the network site implemented by the server $30_n$, the user 10 provides via the end-user equipment 12 information regarding a transaction object. A "transaction object" refers to any physical or virtual object designed to be used in an attempt to make a transaction. For example, a transaction object may be a payment card (e.g., a credit card, a debit card, etc.), an account (e.g., a bank account, an online wallet account, etc.), an electronic check, a set of one or more digital cash (electronic money) certificates, or any other physical or virtual object designed to be used in an attempt to make a transaction.

The information regarding a transaction object, which is provided by the user 10 via the end-user equipment 12, is hereinafter referred to as "transaction object information" and can take on various forms depending on the nature of the online transaction to be made and the nature of the transaction object itself.

For example, the transaction object information may include payment card information regarding a payment card in situations where, for instance, the user 10 desires to purchase or otherwise obtain a product or service offered on the network site implemented by the server $30_n$, pay a bill for a previously obtained product or service via the network site, or make a donation to a charity or other institution through the network site using the payment card. Such payment card information may be, for instance, credit card information regarding a credit card (e.g., a number, expiry date, and/or holder's name) or debit card information regarding a debit card (e.g., a number and/or holder's name). The payment card may comprise one or more card elements adapted to convey part or all of the payment card information, such as one or more sets of characters (e.g., printed and/or embossed characters), a magnetic stripe, and/or a chip (e.g., an EMV chip).

In another example, the transaction object information may include electronic check information regarding an electronic check (e.g., a check number and/or a checking account number) in situations where, for instance, the user 10 desires to effect a payment via the network site implemented by the server $30_n$ using the electronic check. In order to process the payment attempted to be effected by the user 10 using the electronic check, an entity (e.g., a bank or other financial institution) that allows the user 10 to use the electronic check may store on a computer-readable medium (e.g., as part of a database) information regarding the electronic check, including the electronic check information provided by the user 10.

In yet another example, the transaction object information may include digital cash information regarding a set of one or more digital cash certificates (e.g., digital cash certificate identifiers) in situations where, for instance, the user 10 desires to effect a payment via the network site implemented by the server $30_n$ using the set of one or more digital cash certificates. In order to process the payment attempted to be effected by the user 10 using the set of one or more digital cash certificates, an entity (e.g., a bank or other financial institution) that allows the user 10 to use the set of one or more digital cash certificates may store on a computer-readable medium (e.g., as part of a database) information regarding the set of one or more digital cash certificates, including the digital cash information provided by the user 10.

In yet another example, the transaction object information may include account information regarding an account (e.g., an account number and/or holder's name) in situations where, for instance, the user 10 desires to effect a transfer of funds to or from the account via the network site implemented by the server $30_n$. In order to process the transfer of funds attempted to be effected by the user 10, an entity (e.g., a bank or other financial institution) that allows the user 10 to use the account may store on a computer-readable medium (e.g., as part of a database) information regarding the account, including the account information provided by the user 10.

It will be appreciated that these examples are presented for illustrative purposes only since, as mentioned above, the transaction object information provided by the user 10 via the end-user equipment 12 can take on many different forms depending on the nature of the online transaction to be made and the nature of the transaction object itself.

The transaction object information may be provided by the user 10 via the end-user equipment 12 in various ways. For example, the user 10 may use the at least one input device of the computing device 16 to enter the transaction object information and cause this information to be sent by the end-user equipment 12 to the server $30_n$ (or another computer associated with the server $30_n$) over the public packet-switched network 14. Alternatively, the transaction object information may have been previously stored in a memory of the computing device 16, in which case the user 10 may use the at least one input device of the computing device 16 to cause the end-user equipment 12 to send the transaction object information to the server $30_n$ (or another computer associated with the server $30_n$) over the public packet-switched network 14.

The online transaction attempted to be effected by the user 10 may be subjected to various security measures intended to protect information exchanged between the end-user equipment 12 and the public packet-switched network 14 and to counter fraudulent online transactions. For example, the transaction object information provided by the user 10 via the end-user equipment 12 may be encrypted (e.g., using the Secure Socket Layer (SSL) protocol) prior to being sent over the public packet-switched network 14. In other examples, when the transaction object information includes payment card information regarding a payment card, card security code (CSC, also sometimes called card verification value or code (CVV or CVC)) verification may be employed whereby the user 10 is asked to enter the payment card's CSC, and/or address verification systems (AVS) may be employed whereby an address entered by the user 10 is compared to a billing address known to the payment card's issuing bank. Various other security measures may be employed in different cases.

In accordance with an embodiment of the present invention, and in an effort to counter fraudulent online transactions, restrictions may be imposed on where the transaction object information provided by the user 10 via the end-user equipment 12 can be used to make online transactions. More particularly, the transaction object information may be associated with at least one authorized transaction point. An "authorized transaction point" refers to a physical point where attempts to make online transactions using the associated transaction object information are authorized to be made. For example, an authorized transaction point may be a house or other building (or an area thereof). The location of an authorized transaction point, which is hereinafter referred to as an "authorized transaction point location", may be expressed as a civic address (e.g., a billing address where bills for the payment card are to be sent, or another civic address), a set of geo-coordinates (e.g., latitude, longitude), or any other information identifying where the authorized transaction point is located.

By restricting where the transaction object information can be used to make online transactions to one or more very specific locations (i.e., one or more authorized transaction point locations), a fraudulent online transaction using this transaction object information becomes considerably more difficult to make for an individual who maliciously or otherwise without entitlement (e.g., via identity theft, loss or stealing of the associated transaction object, etc.) obtained this transaction object information and/or the associated transaction object, since it requires such individual to be physically present at one of these one or more very specific locations.

For example, the transaction object information may include payment card information regarding a payment card that is authorized to be used to make online purchases or payments from one or more houses or other buildings where the user 10 is expected to make most of his/her online purchases or payments. Restrictions on where the payment card information can be used to make online purchases or payments (i.e., identification of the at least one authorized transaction point) may be specified when the user 10 requests to obtain the payment card, when he/she activates the payment card, or at any other suitable moment via interaction between the user 10 and an entity (e.g., a bank or other financial institution) issuing the payment card. Alternatively or optionally, default restrictions may be set by the entity issuing the payment card (e.g., setting by default a single authorized transaction point as being a house or other building located at a billing address where bills for the payment card are to be sent).

While restrictions are imposed on where the payment card information regarding the payment card can be used to make online transactions, there may be no restrictions (or different restrictions) on where the payment card can be used to make "card-present" transactions, i.e., non-online transactions in which the payment card is physically present at the points of purchase or payment, such as stores, restaurants or other places where in-person purchases or payments are made. This allows the user 10 to use the payment card as a conventional payment card when making in-person purchases or payments, while rendering fraudulent online transactions using the payment card information considerably more difficult to make.

In another example, the transaction object information may include electronic check information regarding an electronic check that is authorized to be used to make online purchases or payments from one or more houses or other buildings where the user 10 is expected to make most of his/her online purchases or payments. In yet another example, the transaction object information may include digital cash information regarding a set of one or more digital cash certificates that is authorized to be used to make online purchases or payments from one or more houses or other buildings where the user 10 is expected to make most of his/her online purchases or payments. In yet another example, the transaction object information may include account information regarding an account that is authorized to be used to make online fund transfers involving the account from one or more houses or other buildings where the user 10 is expected to make most of his/her online fund transfers. Here again, restrictions on where the electronic check information, the digital cash information or the account information can be used to make online purchases, payments or fund transfers (i.e., identification of the at least one authorized transaction point) may be specified when the user 10 requests to obtain the electronic check, the set of one or more digital cash certificates or the account, or at any other suitable moment via interaction between the user 10 and an entity (e.g., a bank or other financial institution) providing the electronic check, the set of one or more digital cash certificates or the account.

It will be appreciated that these examples are presented for illustrative purposes only since, as mentioned above, the transaction object information provided by the user 10 via the end-user equipment 12 can take on many different forms depending on the nature of the online transaction to be made and the nature of the transaction object itself.

Continuing with FIG. 1, in this embodiment, there is provided a network element 51, hereinafter referred to as a "transaction validation server", which is adapted to validate the online transaction attempted to be made by the user 10 using the end-user equipment 12. The transaction validation server 51 is operated, managed or otherwise associated with an entity responsible for validating the online transaction attempted to be made using the transaction object information provided by the user 10 via the end-user equipment 12. For example, this entity may be a bank or other financial institution that provides the transaction object to the user 10 (e.g., a card issuing bank in cases where the transaction object is a credit card or a debit card).

The transaction object information provided by the user 10 via the end-user equipment 12 is communicated by the server $30_n$ (or another computer associated with the server $30_n$) to the transaction validation server 51 via a communication path 55, which may be established over the public packet-switched network 14 and/or another network 59 (e.g., a financial network) and which may traverse one or more network elements (e.g., gateways, other servers). The communication path 55 may take on various forms depending on the nature of the online transaction attempted to be effected by the user 10. An example of the communication path 55 will be described later on.

The transaction validation server 51 has access to a database 53. In some embodiments, the transaction validation server 51 and the database 53 may be part of separate network elements and communicatively coupled to one another via a communication link, which may traverse one or more network elements and comprise one or more physical links and one or more logical links. In other embodiments, the transaction validation server 51 and the database 53 may be part of a common network element. In yet other embodiments, the database 53 may be distributed amongst a plurality of network elements and/or physical locations.

Figure 2:
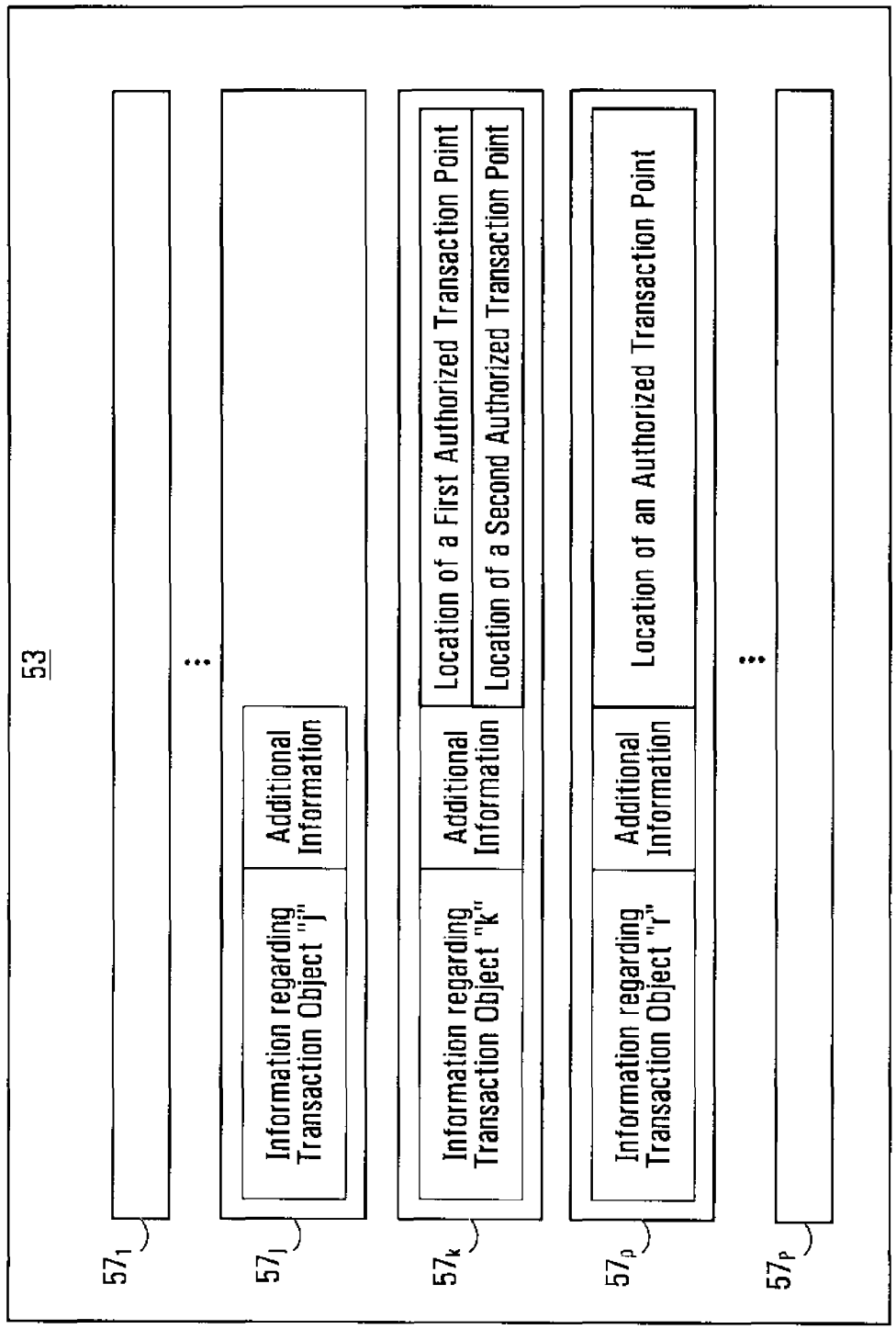
FIG. 2 shows an example of potential contents of a database accessible to a transaction validation server of the architecture shown in FIG. 1.

With additional reference to FIG. 2, there is shown an example of potential contents of the database 53. In this example, the database 53 stores a plurality of records $57_1 \ldots 57_P$, each record being associated with a transaction object. Each of the records $57_1 \ldots 57_P$ includes information regarding the transaction object associated with that record (i.e., transaction object information).

In addition, and in accordance with an embodiment of the present invention, each of the records $57_1 \ldots 57_P$ is indicative of whether the transaction object information included in that record is associated with one or more authorized transaction points from which are authorized attempts to make online transactions using this transaction object information. More particularly, a given one of the records $57_1 \ldots 57_P$ in which the transaction object information is associated with one or more authorized transaction points includes, for each of these one or more authorized transaction points, information indicative of a location of that authorized transaction point, i.e., information indicative of an authorized transaction point location. As previously mentioned, this authorized transaction point location may be expressed as a civic address, a set of geo-coordinates, or any other information identifying where the authorized transaction point is located. The given one of the records $57_1 \ldots 57_P$ thus associates the transaction object information that it includes with the one or more authorized transaction point locations where this transaction object information is authorized to be used in attempts to make online transactions.

In some cases, the transaction object information included in a particular one of the records $57_1 \ldots 57_P$ may not be associated with any authorized transaction point location. For instance, in this case, the transaction object information included in the record $57_j$ is not associated with any authorized transaction point location, while the transaction object information included in the record $57_p$ is associated with one authorized transaction point location and the transaction object information included in the record $57_k$ is associated with two authorized transaction point locations.

Each of the records $57_1 \ldots 57_P$ may also include additional information that may be required to process an online transaction attempted to be made using the transaction object information included in that record. Such additional information depends on the nature of the transaction object associated with that record and can thus take on many forms. For example, in a case where the transaction object associated with a given one of the records $57_1 \ldots 57_P$ is a credit card, the additional information included in that record may include a credit limit, a balance due, a billing address (i.e., an address where credit card bills are to be sent), a list of recent transactions, and possibly other information regarding the credit card (e.g., other card holders' names).

The transaction validation server 51 is operative to use information included in the database 53 to validate the online transaction attempted to be made using the transaction object information provided by the user 10 via the end-user equipment 12. To that end, the transaction validation server 51 comprises suitable hardware, firmware, software, control logic, or a combination thereof for implementing a plurality of functional components, including an interface and a processing unit. The interface of the transaction validation server 51 is adapted to receive messages from and send messages to other servers and/or other computers, and to exchange data with other elements (e.g., databases). The processing unit of the transaction validation server 51 is adapted to effect various processing operations to implement that server's functionality.

In accordance with an embodiment of the present invention, there is provided a network element 34, hereinafter referred to as a "location information server", which can interact with the transaction validation server 51 as part of a process to validate the online transaction attempted to be made using the transaction object information provided by the user 10 via the end-user equipment 12. As further discussed below, the location information server 34 allows the precise location of the end-user equipment 12 to be used in order to validate the online transaction attempted to be made by the user 10 using the end-user equipment 12, particularly in a situation where the transaction object information provided by the user 10 via the end-user equipment 12 is authorized to be used to make online transactions from one or more very specific locations (i.e., one or more authorized transaction point locations).

Interaction between the transaction validation server 51 and the location information server 34 takes place over a communication link 61. The communication link 61 may be established over a network 63, which may comprise part of the public packet-switched network 14, a financial network and/or another network, and may traverse one or more network elements and comprise one or more physical links and one or more logical links. For example, the communication link 61 may be a dedicated and secure link established between the location information server 34 and the transaction validation server 51. It will be recognized that the communication link 61 may be implemented in various manners in different embodiments.

The location information server 34 has access to a location information database 36. In some embodiments, the location information server 34 and the location information database 36 may be part of separate network elements and communicatively coupled to one another via a communication link, which may traverse one or more network elements and comprise one or more physical links and one or more logical links. In other embodiments, the location information server 34 and the location information database 36 may be part of a common network element. In yet other embodiments, the location information database 36 may be distributed amongst a plurality of network elements and/or physical locations.

Figure 3:
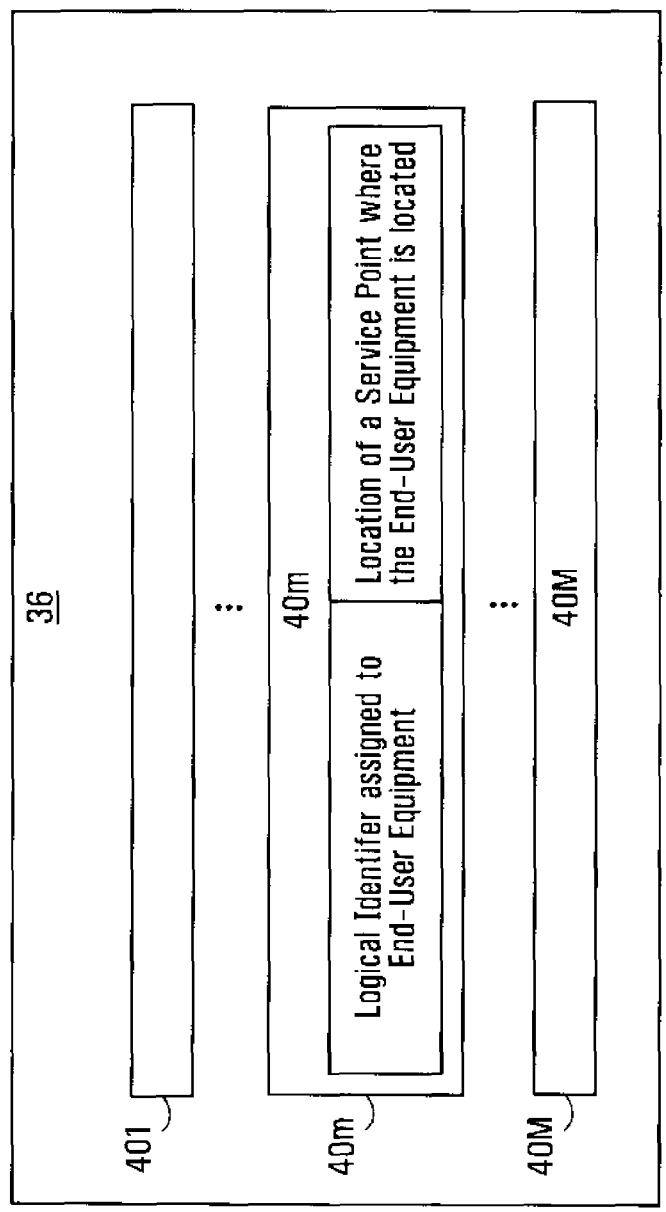
FIG. 3 shows an example of potential contents of a location information database accessible to a location information server of the architecture shown in FIG. 1.

With additional reference to FIG. 3, there is shown an example of potential contents of the location information database 36. In this example, the location information database 36 stores a plurality of records $40_1 \ldots 40_M$, each record associating a logical identifier assigned to end-user equipment (such as the end-user equipment 12) to a location of a service point where that end-user equipment is located. A "service point" refers to a physical point where a network access service is provided to an end-user (such as the user 10) by a service provider (e.g., an Access Service Provider (ASP, also sometimes called a Regional Access Network Provider (RANP)) that may or may not be an Internet Service Provider (ISP)). For example, a service point may be a house or other building (or an area thereof). The location of a service point which is hereinafter referred to as a "service point location", may be expressed as a civic address (e.g., a service address), a set of geo-coordinates, or any other information identifying where the service point is located.

An example process by which the location information database 36 may be populated and maintained is described later on. For now, suffice it to say that the location information database 36 stores the records $40_1 \ldots 40_M$ that associate logical identifiers to service point locations.

The location information server 34 is operative to use information included in the location information database 36 as part of a process to validate the online transaction attempted to be made using the transaction object information provided by the user 10 via the end-user equipment 12. To that end, the location information server 34 comprises suitable hardware, firmware, software, control logic, or a combination thereof for implementing a plurality of functional components, including an interface and a processing unit. The interface of the location information server 34 is adapted to receive messages from and send messages to the transaction validation server 51 as well as other servers and/or other elements communicatively coupled to the location information server 34 via communication links (not shown) that may be established over the public packet-switched network 14 and/or another network and that may traverse one or more network elements and comprise one or more physical links and one or more logical links. The processing unit of the location information server 34 is adapted to effect various processing operations to implement that server's functionality.

Operation of the location information server 34, its interaction with the transaction validation server 51, as well as operation of other network elements, will now be illustrated in the context of an example where the online transaction attempted to be made by the user 10 while interacting with the network site implemented by the server $30_n$ involves the user 10 attempting to purchase a product or service offered on the network site using a particular credit card. Accordingly, for purposes of this example, the transaction validation server 51 is assumed to be a server associated with a card issuing bank, i.e., a financial institution that issued the particular credit card. In this example, therefore, each of the records $57_1 \ldots 57_P$ is associated with a transaction object which is a credit card, and includes transaction object information which is credit card information regarding that credit card.

Figure 4A:
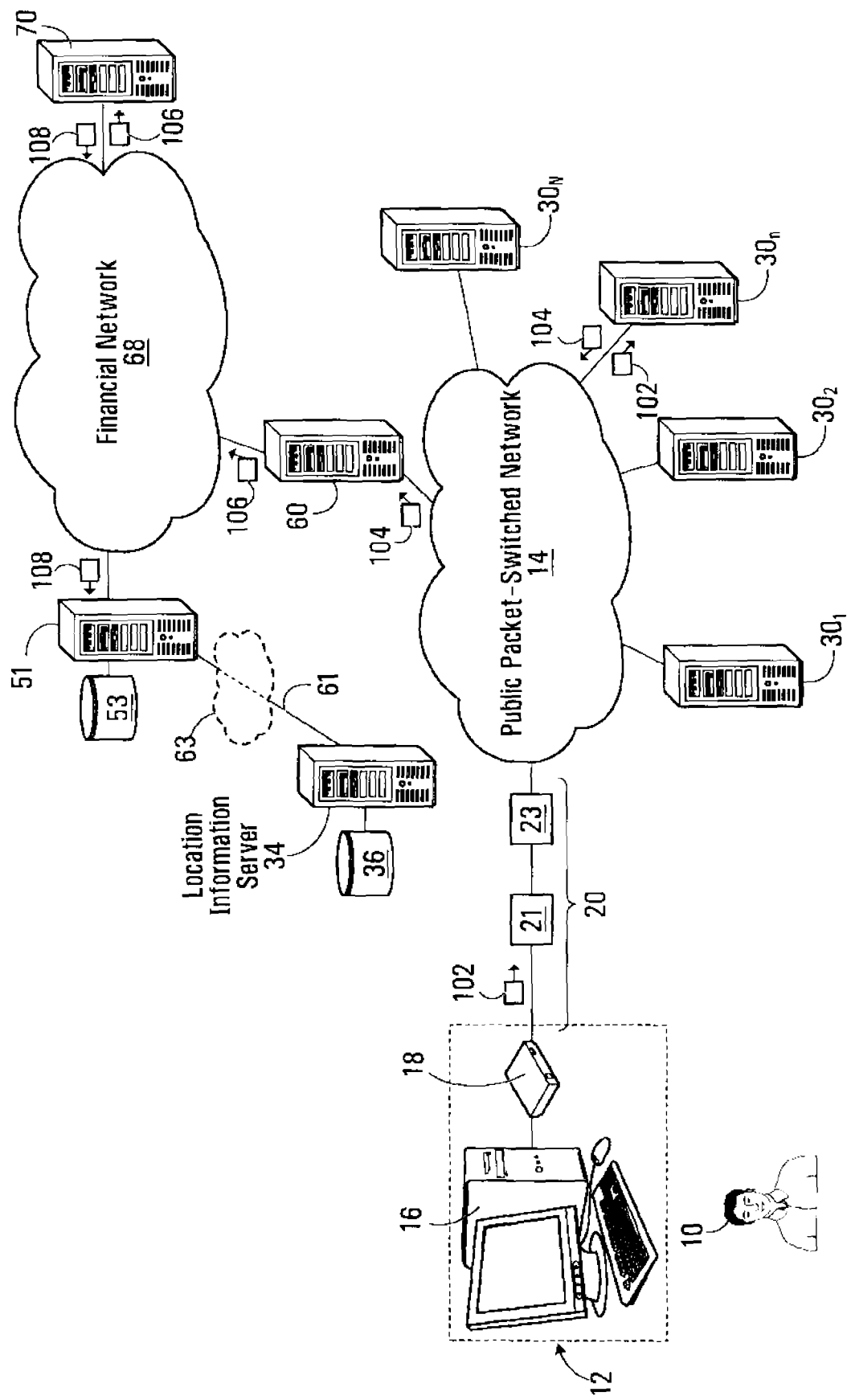
FIGS. 4A and 4B illustrate an example of interaction between the location information server, the transaction validation server and other elements of the architecture shown in FIG. 1, in an example scenario where the user of the end-user equipment attempts to make an online transaction using a credit card.

With reference to FIG. 4A, the user 10 interacts with the network site implemented by the server $30_n$ using the computing device 16 of the end-user equipment 12 in order to select the product or service that he/she desires to purchase. This may involve the user 10 using an online shopping cart implemented by the server $30_n$. Upon selecting the desired product or service, the user 10 indicates that he/she desires to purchase that product or service, for instance, by selecting a "check-out" option on the network site.

The network site then prompts the user 10 to provide payment information to pay for the selected product or service. In this example, the user 10 thus proceeds to enter credit card information regarding the particular credit card. The user 10 then indicates his/her intent to submit an order to purchase the selected product or service using the entered credit card information, for instance, by selecting a "submit order" option on the network site.

At this point, the computing device 16 of the end-user equipment 12 transmits to the server $30_n$ a message 102. In this example, the message 102 conveys: (i) order information indicative of the selected product or service; (ii) purchase amount information indicative of an amount to be paid to purchase the selected product or service; and (iii) the credit card information entered by the user 10 to purchase the selected product or service. The message 102 may also convey the logical identifier assigned to the end-user equipment 12. Alternatively, the logical identifier assigned to the end-user equipment 12 may not be conveyed by the message 102 but may already be known to the server $30_n$ due to prior interaction between the computing device 16 and the server $30_n$.

Since it travels over the public packet-switched network 14, the information to be transmitted to the server $30_n$ as part of the message 102 may be encrypted by the computing device 16 prior to being transmitted to the server $30_n$. This encryption may be effected using the SSL protocol or some other encryption technique, by virtue of interaction between the computing device 16 and the server $30_n$.

Upon receiving the message 102, the server 30 processes the message 102, possibly decrypting one or more of its portions, and proceeds to send a message 104 to a payment gateway 60. The payment gateway 60 is a network element that is connected to a financial network 68 and that is used by the server $30_n$ to process online transactions attempted to be made via the network site implemented by the server $30_n$.

The financial network 68 interconnects a plurality of servers or other computers associated with banks and/or other financial institutions, including, in this example, the transaction validation server 51 that is associated with the card issuing bank and a server 70 that is associated with an acquiring bank, i.e., a financial institution that is used by an entity, in this case, a merchant, which operates, manages or is otherwise associated with the server $30_n$.

The message 104 sent to the payment gateway 60 may be identical to the message 102, i.e., it may be a relayed version of the message 102. Alternatively, the message 104 may be generated by the server $30_n$ based on the message 102 and possibly other information known to the server $30_n$ (e.g., the logical identifier assigned to the end-user equipment 12, if not conveyed by the message 102 but already known to the server $30_n$). In either case, in this example, the message 104 conveys: (i) the purchase amount information indicative of an amount to be paid to purchase the selected product or service; (ii) the credit card information entered by the user 10 to purchase the selected product or service; and (iii) the logical identifier assigned to the end-user equipment 12. Here again, information conveyed by the message 104 may be encrypted prior to transmission to the payment gateway 60.

Upon receiving the message 104, the payment gateway 60 processes the message 104, possibly decrypting one or more of its portions. Based on content of the message 104, the payment gateway 60 determines that it originates from the server $30_n$ and proceeds to send a message 106, over the financial network 68, to the server 70, which is associated with the acquiring bank used by the merchant associated with the server $30_n$. The message 106, which can be viewed as a request for transaction authorization, is intended to elicit from the financial network 68 a response as to whether the online transaction attempted to be made by the user 10 is approved or denied. In this example, the payment gateway 60 generates the message 106 based on the message 104 such that the message 106 conveys: (i) the purchase amount information indicative of an amount to be paid to purchase the selected product or service; (ii) the credit card information entered by the user 10 to purchase the selected product or service; and (iii) the logical identifier assigned to the end-user equipment 12.

The server 70 receives the message 106 and processes it to gain knowledge that a transaction involving the merchant associated with the server $30_n$ is attempted to be effected. Based on the credit card information conveyed by the message 106, the server 70 proceeds to send a message 108 to the transaction validation server 51 over the financial network 68. The message 108 may be identical to the message 106, i.e., it may be a relayed version of the message 106. Alternatively, the message 108 may be generated by the server 70 based on the message 106 and possibly other information known to the server 70. In this example, the message 108 conveys: (i) the purchase amount information indicative of an amount to be paid to purchase the selected product or service; (ii) the credit card information entered by the user 10 to purchase the selected product or service; and (iii) the logical identifier assigned to the end-user equipment 12.

The transaction validation server 51, which is associated with the card issuing bank that issued the particular credit card that has been used by the user 10 to attempt to purchase the selected product or service, receives the message 108. The transaction validation server 51 proceeds to process the message 108 to determine whether the online transaction attempted to be made by the user 10 is to be approved or denied.

The transaction validation server 51 consults the database 53 to identify a particular one of the records $57_1 \ldots 57_P$ that corresponds to the credit card information conveyed by the message 108. In accordance with an embodiment of the present invention, upon identifying the particular one of the records $57_1 \ldots 57_P$, the transaction validation server 51 determines whether the particular record includes information indicative of at least one authorized transaction point location associated with the credit card information included in the particular record (and conveyed by the message 108). In other words, the transaction validation server 51 determines whether the credit card information conveyed by the message 108 is associated with at least one authorized transaction point location where this credit card information is authorized to be used in attempts to make online transactions.

If the transaction validation server 51 determines that the credit card information conveyed by the message 108 is not associated with any authorized transaction point location (i.e., the particular one of the records $57_1 \ldots 57_P$ does not include information indicative of at least one authorized transaction point location), the transaction validation server 51 may proceed to validate the online transaction attempted to be made by the user 10 using a conventional validation process. Approval or denial of the online transaction can be determined based on various factors. For example, based on the additional information (e.g., a credit limit, a balance due, etc.) included in the particular one of the records $57_1 \ldots 57_P$ and the purchase amount information indicative of an amount to be paid to purchase the selected product or service that is conveyed by the message 108, the transaction validation server 51 may determine whether the online transaction is to be approved or denied. It will be appreciated that approval or denial of the online transaction may be determined by the transaction validation server 51 based on other factors. The transaction validation server 51 may then send a message (not shown) to cause approval or denial of the online transaction to be communicated to the server 70, the payment gateway 60, the server $30_n$ and the computing device 16 used by the user 10.

For purposes of this example, assume that the credit card information conveyed by the message 108 is associated with an authorized transaction point location, i.e., the particular one of the records $57_1 \ldots 57_P$ includes information indicative of an authorized transaction point location. More particularly, assume that the credit card information conveyed by the message 108 is authorized to be used to make online transactions from a house or other building (or an area thereof), i.e., the authorized transaction point, where an individual who requested and originally obtained the particular credit card used by the user 10, but who may or may not be the user 10, is expected to make most of his/her online transactions.

Thus, in this example, the transaction validation server 51 determines that the credit card information conveyed by the message 108 is associated with an authorized transaction point location. Accordingly, the transaction validation server 51 proceeds to effect a verification as to whether the physical location from which the online transaction is attempted to be made using the credit card information conveyed by the message 108 corresponds to the authorized transaction point location associated with this credit card information. To that end, the transaction validation server 51 interacts with the location information server 34 to effect this verification on a basis of the logical identifier assigned to the end-user equipment 12 and conveyed by the message 108.

Figure 4B:
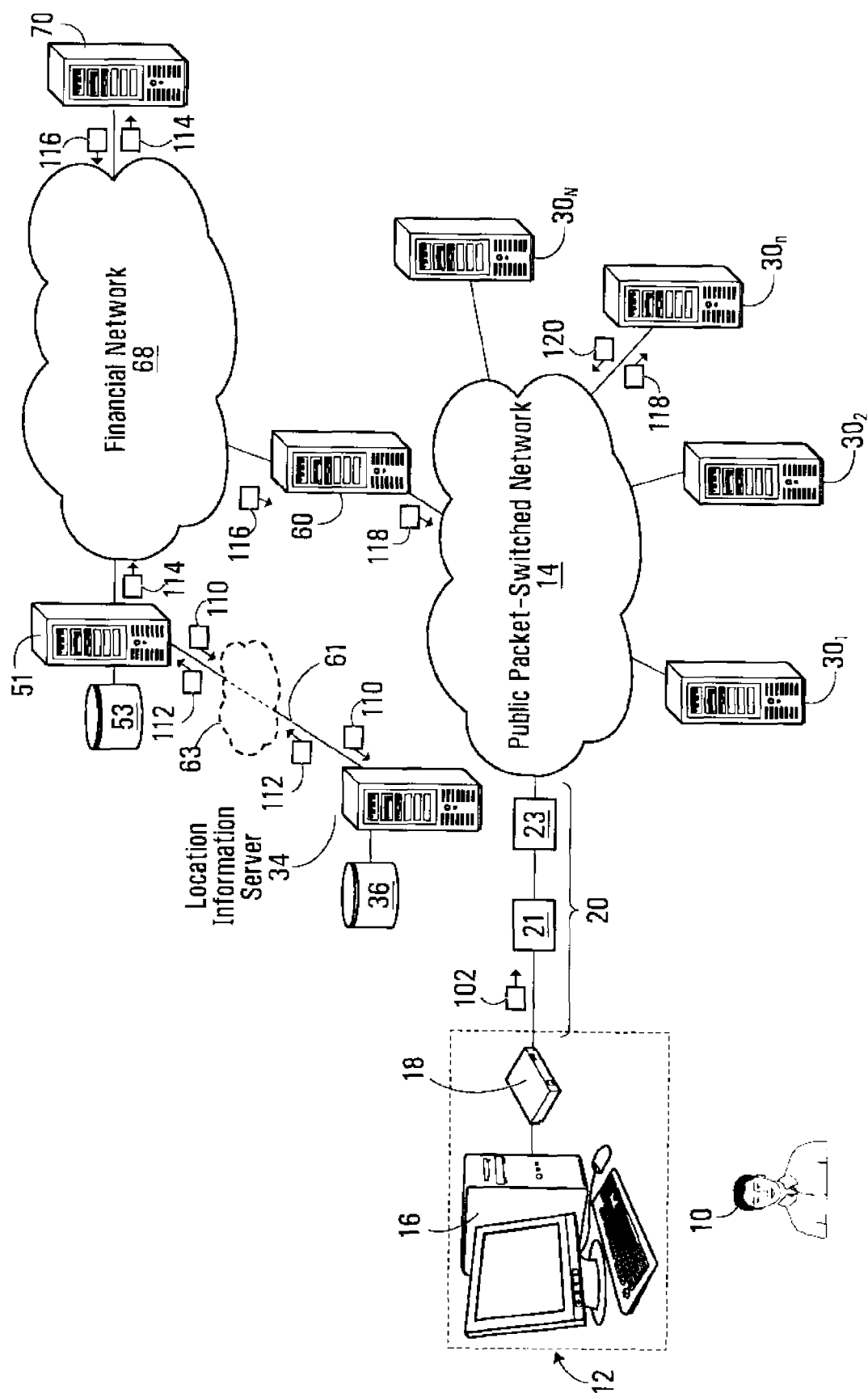

With reference to FIG. 4B, the transaction validation server 51 sends a message 110 to the location information server 34 over the communication link 61. In this embodiment, the message 110 can be viewed as a request to confirm whether the logical identifier assigned to the end-user equipment 12 (and conveyed by the message 108) is associated with a service point location that corresponds to the authorized transaction point location associated with the credit card information provided via the end-user equipment 12 (and conveyed by the message 108). The message 110 thus conveys the logical identifier assigned to the end-user equipment 12 and the authorized transaction point location.

The location information server 34 receives the message 110 and proceeds to process it. More particularly, in this embodiment, the location information server 34 extracts the logical identifier assigned to the end-user equipment 12 and conveyed by the message 110, and consults the location information database 36 in an attempt to find a particular one of the records $40_1 \ldots 40_M$ that corresponds to this logical identifier.

If the location information server 34 is unable to find a particular one of the records $40_1 \ldots 40_M$ that corresponds to the logical identifier assigned to the end-user equipment 12 and conveyed by the message 110, the location information server 34 may send to the transaction validation server 51 a message (not shown) indicating that no service point location associated with this logical identifier can be found. Upon receiving this message, the transaction validation server 51 may take remedial action. For example, the transaction validation server 51 may deny the online transaction attempted to be made using the end-user equipment 12 without performing any further processing operation to assess whether it should be approved or denied. Alternatively, the transaction validation server 51 may perform additional processing operations to determine whether the online transaction attempted to be made by the user 10 is to be approved or denied, including processing operations to re-assess legitimacy of the online transaction attempted to be made by the user 10, i.e., to probe more deeply into whether the user 10 legitimately used the credit card information conveyed by the message 108. For instance, these additional processing operations may effect conventional verifications, such as a card security code (CSC) verification whereby the user 10 is asked to enter the particular credit card's CSC; an address verification system (AVS) whereby the user 10 is asked to enter a billing address for the particular credit card which is compared to an actual billing address known to the card issuing bank; a phone call to a party to which the card issuing bank issued the particular credit card to verbally confirm legitimacy of the online transaction attempted to be made by the user 10, etc.

For purposes of this example, assume that a particular one of the records $40_1 \ldots 40_M$ corresponds to the logical identifier assigned to the end-user equipment 12 and conveyed by the message 110. The location information server 34 thus finds the particular one of the records $40_1 \ldots 40_M$, which associates the logical identifier assigned to the end-user equipment 12 and conveyed by the message 110 to a service point location (e.g., a house or other building's location) where the end-user equipment 12 is located.

The location information server 34 proceeds to compare the service point location obtained from the particular one of the records $40_1 \ldots 40_M$ to the authorized transaction point location conveyed by the message 110. Based on a result of this comparison, the location information server 34 performs an action related to validation of the online transaction attempted to be made using the end-user equipment 12. More specifically, in this embodiment, the action performed by the location information server 34 comprises generating and transmitting to the transaction validation server 51 a message 112 that indicates whether the service point location obtained from the particular one of the records $40_1 \ldots 40_M$ corresponds to the authorized transaction point location conveyed by the message 110. This action is related to validation of the online transaction attempted to be made since the message 112 will be used by the transaction validation server 51 to validate the online transaction, as discussed below.

The transaction validation server 51 receives the message 112 and processes it to learn whether the physical location from which the online transaction is attempted to be made using the credit card information conveyed by the message 108 corresponds to the authorized transaction point location associated with this credit card information. As discussed below, the transaction validation server 51 handles the online transaction in different manners depending on whether or not the physical location from which the online transaction is attempted to be made using the credit card information conveyed by the message 108 corresponds to the authorized transaction point location associated with this credit card information.

If the end-user equipment 12 is not located at the authorized transaction point, the message 112 indicates that the service point location obtained from the particular one of the records $40_1 \ldots 40_M$ (which is associated with the logical identifier assigned to the end-user equipment 12 and conveyed by the message 108) does not correspond to the authorized transaction point location conveyed by the message 110. In this case, the transaction validation server 51 concludes based on the message 112 that the physical location from which the online transaction is attempted to be made using the credit card information conveyed by the message 108 does not correspond to the authorized transaction point location associated with this credit card information. In other words, the transaction validation server 51 concludes that the online transaction attempted to be made using the credit card information conveyed by the message 108 is unauthorized to be made from the physical location from which it is attempted. This may result in the online transaction being denied by the transaction validation server 51 without performing any further processing operation to assess whether it should be approved or denied. Alternatively, the transaction validation server 51 may perform additional processing operations to determine whether the online transaction attempted to be made by the user 10 is to be approved or denied, including processing operations to re-assess legitimacy of the online transaction attempted to be made by the user 10, i.e., to probe more deeply into whether the user 10 legitimately used the credit card information conveyed by the message 108. For instance, and as mentioned above, these additional processing operations may effect conventional verifications, such as a card security code (CSC) verification, an address verification system (AVS); a phone call to verbally confirm legitimacy of the online transaction attempted to be made by the user 10, etc.

In cases where it ultimately denies the online transaction, the transaction validation server 51 may send a message (not shown) to cause denial of the online transaction to be communicated to the server 70, the payment gateway 60, the server $30_n$ and the computing device 16 used by the user 10. This message may indicate (e.g., by a code) a reason for this denial. In cases where it denies the online transaction as being potentially fraudulent, the transaction validation server 51 may also take further action, such as freezing a credit account corresponding to the particular credit card, informing fraud prevention and/or law enforcement authorities of a possible attempt to make a fraudulent online transaction, etc.

For purposes of this example, assume that the end-user equipment 12 is located at the authorized transaction point. In this case, the message 112 indicates that the service point location obtained from the particular one of the records $40_1 \ldots 40_M$ (which is associated with the logical identifier assigned to the end-user equipment 12 and conveyed by the message 108) corresponds to the authorized transaction point location conveyed by the message 110. In this example, therefore, the transaction validation server 51 concludes based on the message 112 that the physical location from which the online transaction is attempted to be made using the credit card information conveyed by the message 108 corresponds to the authorized transaction point location associated with this credit card information. In other words, the transaction validation server 51 concludes that the online transaction attempted to be made using the credit card information conveyed by the message 108 is authorized to be made from the physical location from which it is attempted.

The transaction validation server 51 proceeds to perform other processing operations to determine whether the online transaction attempted to be made by the user 10 is to be approved or denied. Approval or denial of the online transaction can be determined based on various factors. For example, based on the additional information (e.g., a credit limit, a balance due, etc.) included in the particular one of the records $57_1 \ldots 57_P$ and the purchase amount information indicative of an amount to be paid to purchase the selected product or service that is conveyed by the message 108, the transaction validation server 51 may determine whether the online transaction is to be approved or denied. It will be appreciated that approval or denial of the online transaction may be determined by the transaction validation server 51 based on other factors.

Upon determining whether the online transaction is approved or denied, the transaction validation server 51 sends a message 114 to the server 70 over the financial network 68. The message 114 indicates whether the online transaction is approved or denied. If the online transaction is denied, the message 114 may indicate (e.g., by a code) a reason for this denial, such as insufficient funds, an unavailable bank link, etc.

The server 70 receives the message 114 and processes it to know whether the online transaction is approved or denied. If approved, the online transaction is eventually settled via a settlement process involving the acquiring bank and the card issuing bank. This settlement process is well known and thus not described herein.

The server 70 proceeds to send a message 116 to the payment gateway 60. The message 116 may be identical to the message 114, i.e., it may be a relayed version of the message 114. Alternatively, the message 116 may be generated by the server 70 based on the message 114. The message 116 indicates whether the online transaction is approved or denied and, if applicable, may indicate a reason for denial of the online transaction.

Upon receiving the message 116, the payment gateway 60 processes it and proceeds to send a message 118 to the server $30_n$. Generated by the payment gateway 60 on a basis of the message 116, the message 118 indicates whether the online transaction is approved or denied and, if applicable, may indicate a reason for denial of the online transaction. Information conveyed by the message 118 may be encrypted by the payment gateway 60 prior to being transmitted to the server $30_n$.

The server $30_n$ receives the message 118. The server $30_n$ processes the message 118, possibly decrypting one or more of its portions, to ascertain whether the online transaction is approved or denied. Approval or denial of the online transaction (and a reason for denial, if applicable) may be recorded by the server $30_n$ for future reference. The server $30_n$ proceeds to send a message 120 to the computing device 16 of the end-user equipment 12 in order to communicate approval or denial of the online transaction to the user 10. Since it travels over the public packet-switched network 14, information conveyed by the message 120 may be encrypted by the server $30_n$ prior to being transmitted to the computing device 16.

Upon receiving the message 120, the computing device 16 processes the message 120, possibly decrypting one or more of its portions, so as to communicate approval or denial of the online transaction to the user 10. For example, this may be achieved by displaying a "transaction approved" or "transaction denied" message (or any conceivable variant thereof) on the display of the computing device 16.

It will thus be appreciated that, by restricting where the credit card information provided by the user 10 can be used to make online transactions to one or more very specific locations (i.e., one or more authorized transaction point locations), a fraudulent online transaction using this credit card information becomes considerably more difficult to make for an individual who maliciously or otherwise without entitlement (e.g., via identity theft, loss or stealing of the particular credit card, etc.) obtained this credit card information and/or the particular credit card, since it requires such individual to be physically present at one of these one or more very specific locations. In addition, there may be no restrictions (or different restrictions) on where the particular credit card can be used to make "card-present" transactions, i.e., non-online transactions in which the particular credit card is physically present at the points of purchase or payment, such as stores, restaurants or other places where in-person purchases or payments are made. This allows the user 10 to use the particular credit card as a conventional credit card when making in-person purchases or payments, while rendering fraudulent online transactions using the associated credit card information considerably more difficult to make.

While the above-described example illustrates one possible manner of verifying whether the physical location from which the online transaction is attempted to be made using the credit card information provided by the user 10 corresponds to the authorized transaction point location associated with this credit card information, it will be appreciated that this verification may be effected in various other manners in other embodiments.

Figure 4C:
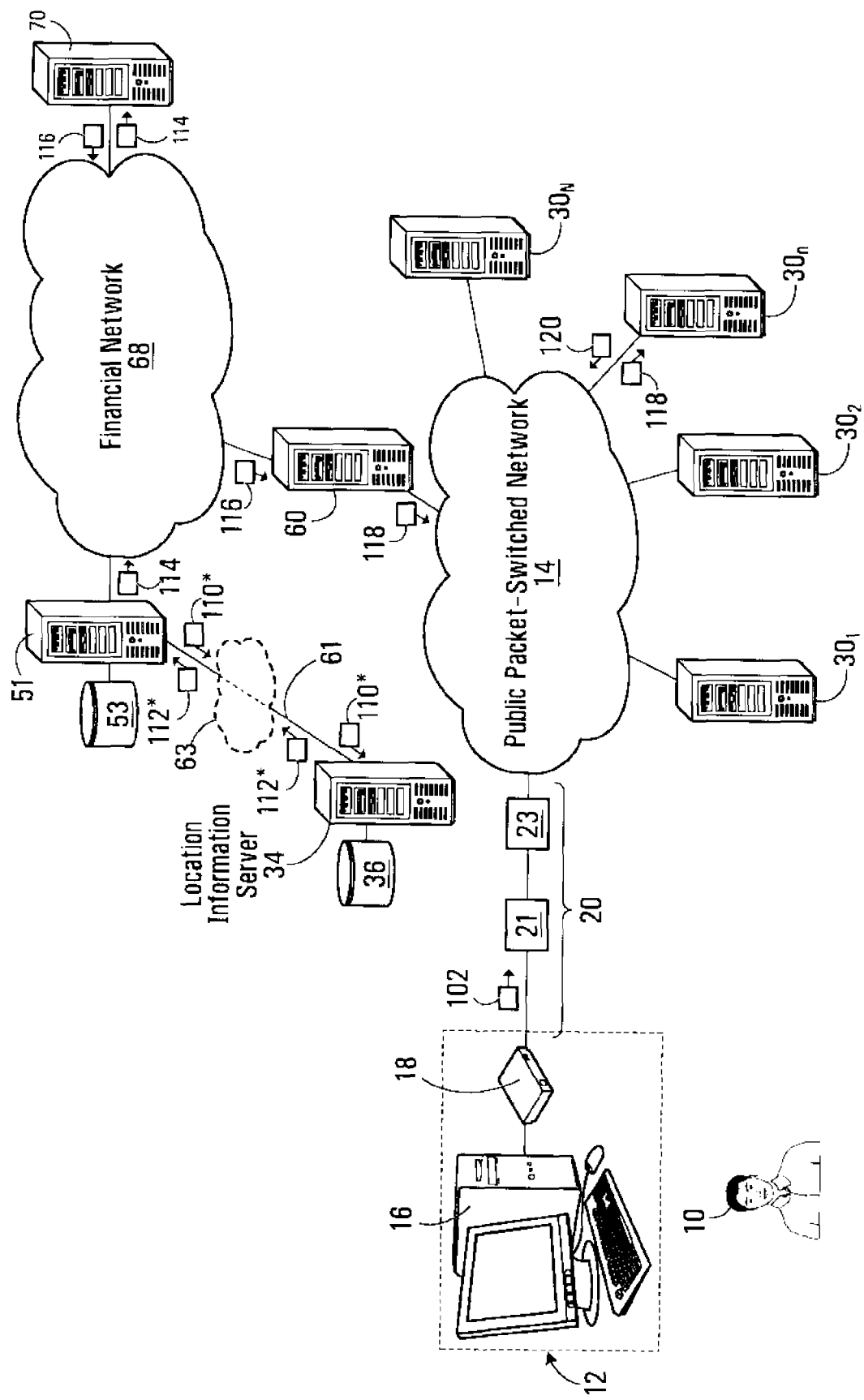
FIG. 4C illustrates a variant to the example considered in FIGS. 4A and 4B.

For example, FIG. 4C illustrates one possible variant. In this variant, messages have been exchanged has described above in connection with FIG. 4A, leading up to receipt of the message 108 by the transaction validation server 51, which proceeds to process the message 108 to determine whether the online transaction attempted to be made by the user 10 is to be approved or denied.

The transaction validation server 51 sends a message 110\* to the location information server 34 over the communication link 61. In this embodiment, the message 110\* can be viewed as a request to obtain a service point location that is associated with the logical identifier assigned to the end-user equipment 12 (and conveyed by the message 108). The message 110\* thus conveys the logical identifier assigned to the end-user equipment 12.

The location information server 34 receives the message 110\* and proceeds to process it. More particularly, in this embodiment, the location information server 34 extracts the logical identifier assigned to the end-user equipment 12 and conveyed by the message 110\*, and consults the location information database 36 in an attempt to find a particular one of the records $40_1 \ldots 40_M$ that corresponds to this logical identifier.

If the location information server 34 is unable to find a particular one of the records $40_1 \ldots 40_M$ that corresponds to the logical identifier assigned to the end-user equipment 12 and conveyed by the message 110\*, the location information server 34 may send to the transaction validation server 51 a message (not shown) indicating that no service point location associated with this logical identifier can be found. Upon receiving this message, the transaction validation server 51 may take remedial action. For example, the transaction validation server 51 may deny the online transaction attempted to be made using the end-user equipment 12 without performing any further processing operation to assess whether it should be approved or denied. Alternatively, the transaction validation server 51 may perform additional processing operations to determine whether the online transaction attempted to be made by the user 10 is to be approved or denied, including processing operations to re-assess legitimacy of the online transaction attempted to be made by the user 10, i.e., to probe more deeply into whether the user 10 legitimately used the credit card information conveyed by the message 108. For instance, these additional processing operations may effect conventional verifications, such as a card security code (CSC) verification whereby the user 10 is asked to enter the particular credit card's CSC; an address verification system (AVS) whereby the user 10 is asked to enter a billing address for the particular credit card which is compared to an actual billing address known to the card issuing bank; a phone call to a party to which the card issuing bank issued the particular credit card to verbally confirm legitimacy of the online transaction attempted to be made by the user 10, etc.

For purposes of this example, assume that a particular one of the records $40_1 \ldots 40_M$ corresponds to the logical identifier assigned to the end-user equipment 12 and conveyed by the message 110\*. The location information server 34 thus finds the particular one of the records $40_1 \ldots 40_M$, which associates the logical identifier assigned to the end-user equipment 12 and conveyed by the message 110\* to a service point location (e.g., a house or other building's location) where the end-user equipment 12 is located.

The location information server 34 proceeds to perform an action related to validation of the online transaction attempted to be made using the end-user equipment 12. In this embodiment, the action performed by the location information server 34 comprises generating and transmitting to the transaction validation server 51 a message 112' that conveys the service point location included in the particular one of the records $40_1 \ldots 40_M$ (i.e., the location of the service point where the end-user equipment 12 is located). This action is related to validation of the online transaction attempted to be made since the message 112' will be used by the transaction validation server 51 to validate the online transaction, as discussed below.

The transaction validation server 51 receives the message 112' and processes it. More particularly, the transaction validation server 51 compares the service point location conveyed by the message 112\* (and obtained from the particular one of the records $40_1 \ldots 40_M$ of the location information database 36) to the authorized transaction point location obtained from the particular one of the records $57_1 \ldots 57_P$ of the database 53. As discussed below, the transaction validation server 51 handles the online transaction in different manners depending on whether or not the service point location conveyed by the message 112\* corresponds to the authorized transaction point location obtained from the particular one of the records $57_1 \ldots 57_P$ of the database 53.

If the end-user equipment 12 is not located at the authorized transaction point, the transaction validation server 51 concludes that the service point location conveyed by the message 112\* (which is associated with the logical identifier assigned to the end-user equipment 12 and conveyed by the message 108) does not correspond to the authorized transaction point location obtained from the particular one of the records $57_1 \ldots 57_P$ of the database 53. In this case, the transaction validation server 51 concludes that the physical location from which the online transaction is attempted to be made using the credit card information conveyed by the message 108 does not correspond to the authorized transaction point location associated with this credit card information. In other words, the transaction validation server 51 concludes that the online transaction attempted to be made using the credit card information conveyed by the message 108 is unauthorized to be made from the physical location from which it is attempted. This may result in the online transaction being denied by the transaction validation server 51 without performing any further processing operation to assess whether it should be approved or denied. Alternatively, the transaction validation server 51 may perform additional processing operations to determine whether the online transaction attempted to be made by the user 10 is to be approved or denied, including processing operations to re-assess legitimacy of the online transaction attempted to be made by the user 10, i.e., to probe more deeply into whether the user 10 legitimately used the credit card information conveyed by the message 108. For instance, and as mentioned above, these additional processing operations may effect conventional verifications, such as a card security code (CSC) verification, an address verification system (AVS); a phone call to verbally confirm legitimacy of the online transaction attempted to be made by the user 10, etc.

In cases where it ultimately denies the online transaction, the transaction validation server 51 may send a message (not shown) to cause denial of the online transaction to be communicated to the server 70, the payment gateway 60, the server 30$_n$ and the computing device 16 used by the user 10. This message may indicate (e.g., by a code) a reason for this denial. In cases where it denies the online transaction as being potentially fraudulent, the transaction validation server 51 may also take further action, such as freezing a credit account corresponding to the particular credit card, informing fraud prevention and/or law enforcement authorities of a possible attempt to make a fraudulent online transaction, etc.

For purposes of this example, assume that the end-user equipment 12 is located at the authorized transaction point. In this case, the transaction validation server 51 concludes that the service point location conveyed by the message 112* (which is associated with the logical identifier assigned to the end-user equipment 12 and conveyed by the message 108) corresponds to the authorized transaction point location obtained from the particular one of the records 57$_1$ ... 57$_P$ of the database 53. In this example, therefore, the transaction validation server 51 concludes that the physical location from which the online transaction is attempted to be made using the credit card information conveyed by the message 108 corresponds to the authorized transaction point location associated with this credit card information. In other words, the transaction validation server 51 concludes that the online transaction attempted to be made using the credit card information conveyed by the message 108 is authorized to be made from the physical location from which it is attempted.

The transaction validation server 51 proceeds to perform other processing operations to determine whether the online transaction attempted to be made by the user 10 is to be approved or denied. Approval or denial of the online transaction can be determined based on various factors. For example, based on the additional information (e.g., a credit limit, a balance due, etc.) included in the particular one of the records 57$_1$ ... 57$_P$ and the purchase amount information indicative of an amount to be paid to purchase the selected product or service that is conveyed by the message 108, the transaction validation server 51 may determine whether the online transaction is to be approved or denied. It will be appreciated that approval or denial of the online transaction may be determined by the transaction validation server 51 based on other factors.

Upon determining whether the online transaction is approved or denied, the transaction validation server 51 sends the message 114 to the server 70 over the financial network 68, as described above in connection with FIG. 4B. This variant then continues as described above in connection with FIG. 4B.

While this variant illustrates another possible manner of verifying whether the physical location from which the online transaction attempted to be made using the credit card information provided via the end-user equipment 12 corresponds to the authorized transaction point associated with this credit card information, it will be appreciated that this verification may be effected in various other manners in other embodiments.

Although the above-described example relates to an online transaction involving an online purchase using a credit card, it will be recognized that principles described herein apply to other types of online transactions, including, for example, those involving online purchases or payments using other payment objects (e.g., digital cash, electronic checks) or online fund transfers involving accounts (e.g., bank accounts, online wallet accounts).

In addition, while in the above-described example certain messages are exchanged between various elements of the architecture depicted in FIG. 1, it will be appreciated that different messages may be exchanged in other embodiments.

Furthermore, although in the above-described example the transaction validation server 51 interacts with the location information server 34, it will be appreciated that, in other embodiments, other network elements may interact with the location information server 34 as part of a process to validate the online transaction attempted to be made by the user 10 via the end-user equipment 12. For example, in some embodiments, and depending on the nature of the online transaction attempted to be made by the user 10, the payment gateway 60, the server 70, the server 30$_n$ or any other network element may interact with the location information server 34 as part of a process to validate the online transaction attempted to be made.

Moreover, while the above-described example relates to an online transaction attempted to be made over the public packet-switched network 14, it will be recognized that principles described herein apply to online transactions attempted to be made over a private packet-switched network.

Figure 5:
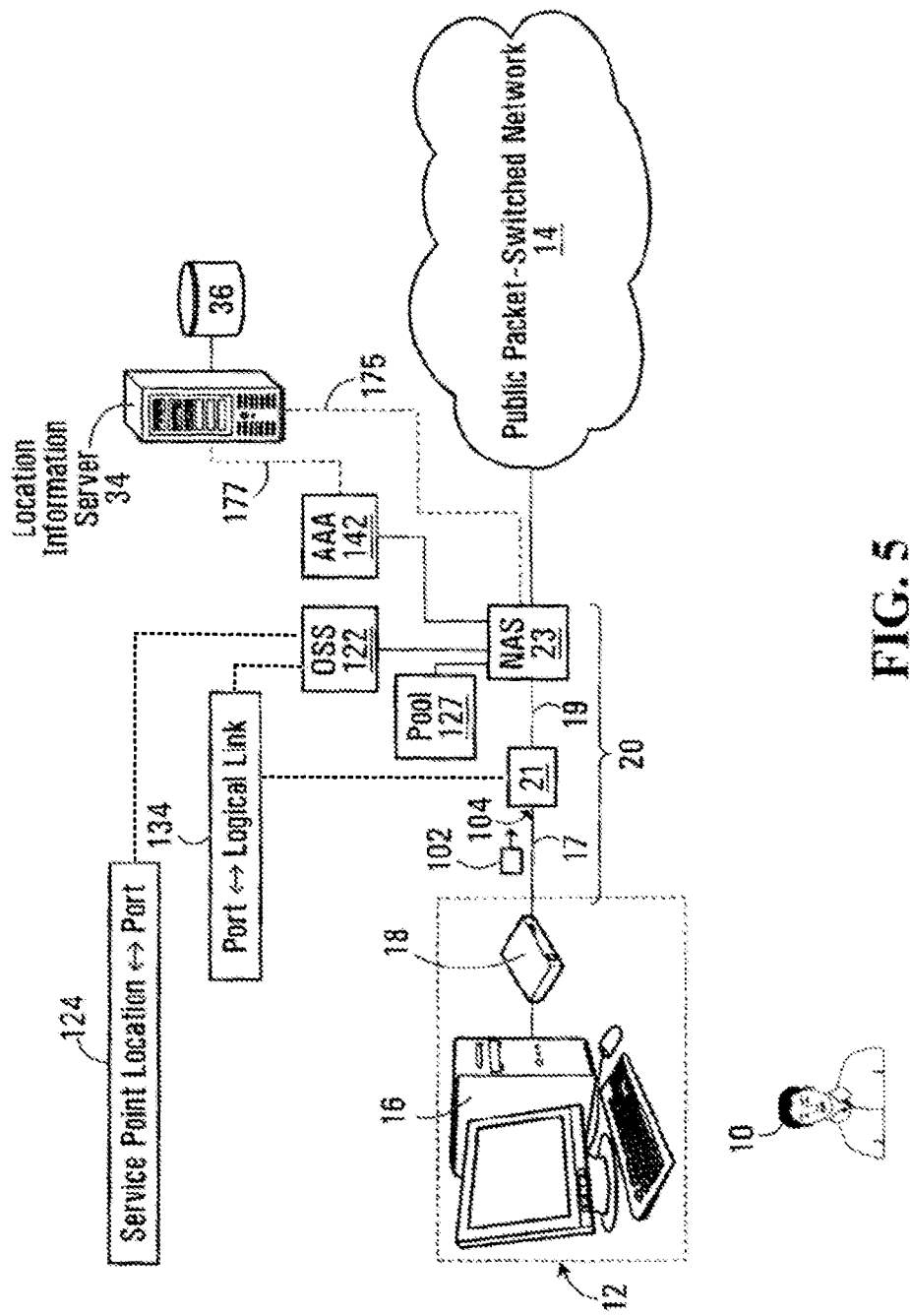
FIGS. 5 to 7 illustrate an example process by which the location information database of the architecture shown in FIG. 1 may be populated, in accordance with an embodiment of the present invention.

Turning now to FIG. 5, an example process by which the location information database 36 may be populated and maintained will be described. It is recalled that the location information database 36 stores the records 40$_1$ ... 40$_M$ that associate logical identifiers to service point locations.

This example will illustrate one possible manner by which an association between the logical identifier assigned to the end-user equipment 12 and the location of a service point (e.g., a house or other building) where the end-user equipment 12 is located, may be stored in the location information database 36 as part of one of the records 40$_1$ ... 40$_M$.

In this example, the infrastructure described above in connection with FIG. 1 comprises an operation support system (OSS) 122. The OSS 122 represents a collection of systems that perform management, inventory, engineering, planning, repair and other functions for a broadband service provider. In this light, one of the functions of the OSS 122 may include management of network elements, assets and equipment. Thus, the OSS 122 maintains a mapping 124 between, on the one hand, ports of various access multiplexers or other network elements under control of the broadband service provider and, on the other, service point locations of end-user equipment (such as the end-user equipment 12) connected to those ports. In this case, the mapping 124 maintained by the OSS 122 relates a port 104 of the network element 21 to a service point location, i.e., the location of a service point where the end-user equipment 12 is located. As mentioned previously, this service point location may be expressed as a civic address, a set of geo-coordinates, or any other information identifying where the service point is located.

Also, in this example, the network element 21 of the communication link 20 connecting the end-user equipment 12 to the public packet-switched network 14 is an access multiplexer. In one embodiment, the access multiplexer 21 may be a DSLAM.

The access multiplexer 21 is connected to the network element 23, which, in this embodiment, is a network access server (NAS). The NAS 23, which may also sometimes be referred to as a broadband remote access server (BRAS), a remote access server (RAS) or a broadband access server (BAS), provides access to the public packet-switched network 14. Communication between the access multiplexer 21 and the NAS 23 can take place over the dedicated logical link 19 between these elements. The dedicated logical link 19, which may traverse an intervening access data network (not shown), can be implemented in various ways. For example, in one embodiment, the dedicated logical link 19 may be implemented as an asynchronous transfer mode (ATM) permanent virtual circuit (PVC). In another embodiment, the dedicated logical link 19 may be implemented as a virtual local area network (VLAN). It will be appreciated that various other implementations of the dedicated logical link 19 are possible.

The access multiplexer 21 allows data arriving from the NAS 23 along given ATM PVCs, VLANs or other dedicated logical links to be sent over corresponding physical links via corresponding one of its ports, and vice versa. Thus, the access multiplexer 21 can be said to implement a mapping 134 between, on the one hand, dedicated logical links and, on the other, ports of the access multiplexer 21. In this example, the mapping 134 implemented by the access multiplexer 21 relates the dedicated logical link 19 to the port 104 of the access multiplexer 21. In two example embodiments, the mapping 134 can be maintained by either the access multiplexer 21 or the OSS 122.

The infrastructure shown in FIG. 5 further comprises an authorization element 142 connected to the NAS 23. The nature of the connection between the NAS 23 and the authorization element 142 is immaterial. For example, in one embodiment, the authorization element 142 may be a server (e.g., an Authentication, Authorization, and Accounting (AAA) server) responsive to queries from the NAS 23. In such an embodiment, the authorization element 142 and the NAS 23 may communicate using the Remote Authentication Dial In User Service (RADIUS) protocol, a description of which is available at www.ietf.org/rfc/rfc2865.txt. In another embodiment, the authorization element 142 may be a functional element integrated with the NAS 23.

In this example, the NAS 23 is operative to maintain a pool 127 of pre-allocated logical identifiers that can be used by various end-user equipment, including the end-user equipment 12. In some embodiments, the pool 127 of logical identifiers may be built up as a cooperative effort between the NAS 23 and the OSS 122, while in other embodiments, it may not be necessary for the OSS 122 to be involved in creating the pool 127 of logical identifiers. In still other embodiments, the pool 127 of logical identifiers may be maintained by the authorization element 142, and may be made accessible to the authorization element 142 without needing to pass through the NAS 23.

The location information server 34, and the location information database 36 that it has access to, can be linked to other components of the infrastructure of FIG. 5 in various ways. For example, in one embodiment, the location information server 34 may be connected to the NAS 23 by a link 175. In another embodiment, the location information server 34 may be connected to the authorization element 142 by a link 177. The nature of the connection between the location information server 34 and either the NAS 23 or the authorization element 142 is immaterial. In other embodiments, the location information server 34 may be part of either the OSS 122, the NAS 23 or the authorization element 142.

As preciously mentioned, in some embodiments, the location information server 34 and the location information database 36 may be part of separate network elements and communicatively coupled to one another via a communication link, which may traverse one or more network elements and comprise one or more physical links and one or more logical links. In other embodiments, the location information server 34 and the location information database 36 may be part of a common network element. In yet other embodiments, the location information database 36 may be distributed amongst a plurality of network elements and/or physical locations. Also, it should be appreciated that the location information database 36 may be managed, maintained and/or updated by an entity that may be the same entity as, or a different entity from, the entity that is responsible for providing the end-user equipment 12 with access to the public packet-switched network 14.

It will be appreciated that numerous modifications and variations of the infrastructure of FIG. 5 are possible. For example, in some embodiments, the access multiplexer 21 can be omitted. This may be true in embodiments where the end-user equipment 12 implements a wireless access point. For instance, in such embodiments, the connection between the wireless access point and the NAS 23 may be provided by a dedicated point-to-point link. As another example, in some embodiments, instead of the dedicated logical link 19, there may be a shared link leading to the end-user equipment 12.

Figure 6:
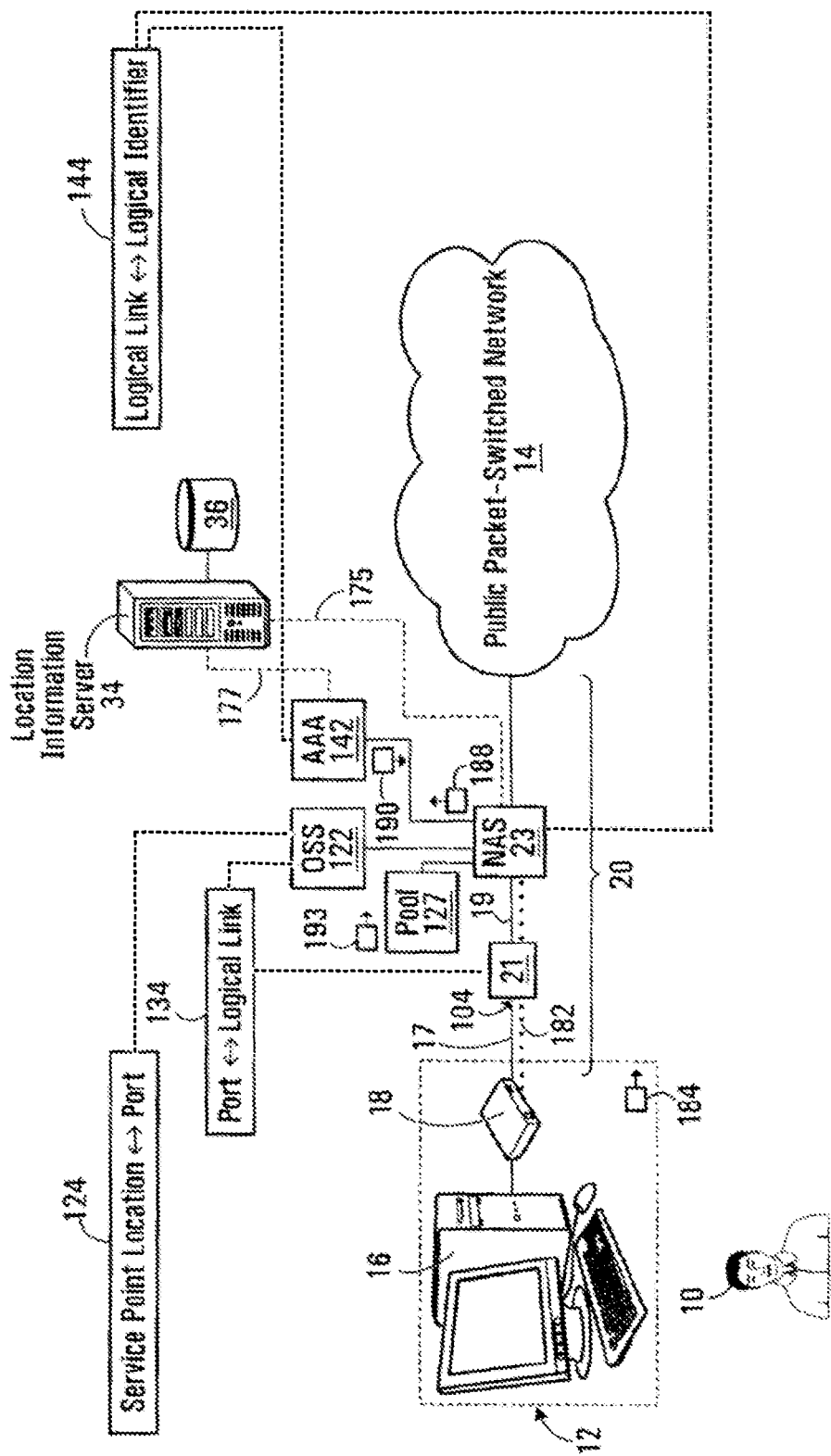

Reference is now made to FIG. 6, which illustrates an example of a possible event flow upon activation of the end-user equipment 12, which may occur, for instance, as the network interface unit 18 and/or the computing device 16 of the end-user equipment 12 is/are powered up. Thereafter:

The end-user equipment 12 establishes physical layer connectivity with the access multiplexer 21 over the physical link 17.

This is followed by establishment of Ethernet connectivity between the end-user equipment 12 and the access multiplexer 21.

The end-user equipment 12 verifies its ability to communicate using Point-to-Point Protocol over Ethernet (PPPoE). For a more detailed explanation of PPPoE, one may refer to Internet Request For Comments (RFC) 2516, available from the Internet Engineering Task Force (http://www.ietf.org), hereby incorporated by reference herein.

Next, assuming that the end-user equipment 12 has the ability to communicate using PPPoE, the end-user equipment 12 verifies whether it should make a so-called "access request" automatically or in response to user input (which can be obtained via a software application). For purposes of this example, let it be assumed that conditions have been met such that the end-user equipment 12 should make an access request.

The end-user equipment 12 begins entry into PPPoE communication by broadcasting an "initiation" packet over the dedicated logical link 19.

The NAS 23 responds to receipt of the initiation packet by sending an "offer" packet to the end-user equipment 12. Thus, at this stage, it can be said that a logical connection 182 has been defined between a first endpoint (the end-user equipment 12) and a second endpoint (the NAS 23).

Following receipt of the offer packet, the end-user equipment 12 sends an access request 184 to the NAS 23 with the ultimate goal of accessing the public packet-switched network 14. The access request 184 may comprise credentials that can be hard coded or programmably installed on the end-user equipment 12.

Alternatively, the credentials may be entered by the user 10 of the end-user equipment 12.

Upon receipt of the access request 184 containing the credentials along the dedicated logical link 19, the NAS 23 executes an authorization procedure as follows. The NAS 23 communicates the credentials to the authorization element 142, e.g., via a RADIUS Access-Request message 188. In response to receipt of the credentials from the NAS 23, the authorization element 142 determines whether the credentials allow access to the public packet-switched network 14. For example, this can be determined by consulting a database (not shown). If the credentials allow access to the public packet-switched network 14, the authorization element 142 returns an acceptance message (e.g., a RADIUS Access-Accept message). On the other hand, if the credentials do not allow access to the public packet-switched network 14, the authorization element 142 returns a refusal message (e.g., a RADIUS Access-Reject message). For purposes of this example, assume that the credentials allow access to the public packet-switched network 14, resulting in issuance of an acceptance message 190. In this example, two alternatives are possible:

Alternative 1 (where the pool 127 of logical identifiers is maintained by the authorization element 142): the authorization element 142 obtains a logical identifier 193 from the pool 127 of logical identifiers that is maintained by the authorization element 142. The logical identifier 193 is sent to the NAS 23, which assigns the logical identifier 193 to the dedicated logical link 19.

Alternative 2 (where the pool 127 of logical identifiers is maintained by the NAS 23): responsive to receipt of the acceptance message 190 from the authorization element 142, the NAS 23 obtains a logical identifier 193 from the pool 127 of logical identifiers that is maintained by the NAS 23. The logical identifier 193 so obtained is assigned by the NAS 23 to the dedicated logical link 19.

The NAS 23 sends a "confirmation" packet back to the end-user equipment 12, thus completing establishment of a PPPoE session between the endpoints of the logical connection 182.

Additional hand-shaking may be performed between the end-user equipment 12 and the NAS 23 in order to establish a Point-to-Point Protocol (PPP) session between the endpoints of the logical connection 182.

Following this, further hand-shaking may be undertaken between the end-user equipment 12 and the NAS 23 in order to establish an Internet Protocol Control Protocol (IPCP) session between the endpoints of the logical connection 182.

During the IPCP session, the NAS 23 releases the logical identifier 193 towards the end-user equipment 12 that issued the access request 184, in order to allow the end-user equipment 12 to identify itself using the logical identifier 193 in future communications over the dedicated logical link 19. Since the dedicated logical link 19 to which has been assigned the logical identifier 193 leads to the end-user equipment 12 and since the end-user equipment 12 will identify itself using the logical identifier 193 in future communications, it can be seen that the logical identifier 193 is in essence assigned to the end-user equipment 12.

It is recalled that once the logical identifier 193 has been obtained from the pool 127 of logical identifiers (either by the NAS 23 or by the authorization element 142), the NAS 23 assigns the logical identifier 193 to the dedicated logical link 19.

In an embodiment where the location information server 34 is connected to the NAS 23 by the link 175, the fact that the NAS 23 assigns the logical identifier 193 to the dedicated logical link 19 allows the NAS 23 to construct and maintain a mapping 144 between, on the one hand, various dedicated logical links (such as the dedicated logical link 19 and others) and, on the other, logical identifiers corresponding to those dedicated logical links.

In an embodiment where the location information server 34 is connected to the authorization element 142 by the link 177, the logical identifier 193 and the identity of the dedicated logical link 193 to which it is assigned are sent back by the NAS 23 to the authorization element 142, and it is the authorization element 142 that maintains the aforementioned mapping 144 between dedicated logical links and logical identifiers corresponding to those dedicated logical links.

Of course, those skilled in the art will be able to think of other ways of causing the end-user equipment 12 to send the access request 184 over the logical connection 182 between the end-user equipment 12 and the NAS 23, as well as other ways of assigning a logical identifier to the dedicated logical link 19. It should further be mentioned that, in some cases, the establishment of the aforementioned PPPoE, PPP and/or IPCP sessions may not be required. This is particularly the case where the dedicated logical link 19 is a VLAN.

In view of the preceding description, and in particular given the previously described mappings 124, 134 maintained in the OSS 122 and/or the access multiplexer 21 and the mapping 144 maintained in the NAS 23 or the authorization element 142, the following describes how one can create an association between logical identifiers and service point locations.

Figure 7:
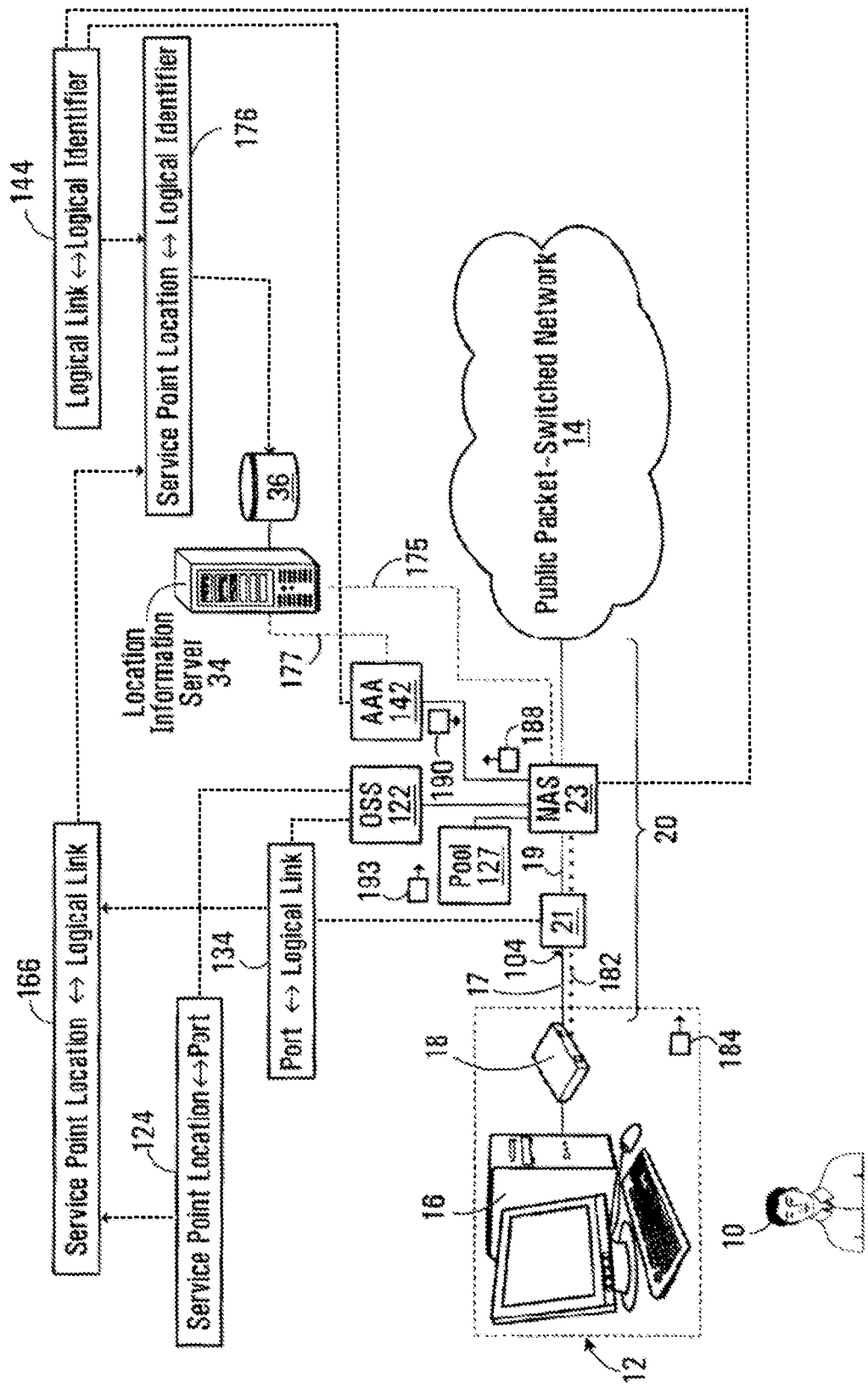

Specifically, with reference to FIG. 7, by combining the mapping 124 with the mapping 134, the OSS 122 can create an intermediate mapping 166 between, on the one hand, dedicated logical links and, on the other hand, service point locations of end-user equipment having logical connections with the NAS 23 which traverse those dedicated logical links. In this example, the intermediate mapping 166 would associate the dedicated logical link 19 to the service point Location of the end-user equipment 12. In one embodiment, the OSS 122 transmits the intermediate mapping 166 to the location information server 34.

Next, the location information server 34 may be operative to combine the intermediate mapping 166 (received from the OSS 122) with the aforementioned mapping 144 (received from the NAS 23 or the authorization element 142), thus creating a final mapping 176 between, on the one hand, logical identifiers (such as IP addresses) and, on the other, service point locations of end-user equipment having logical connections with the NAS 23 which traverse respective dedicated logical links to which those logical identifiers have been assigned. In this example, the final mapping 176 would specify that the logical identifier 193 corresponds to the service point location of the end-user equipment 12, i.e., the location of the service point where the end-user equipment 12 is located. This is precisely the type of association that is useful to have stored in the location information database 36.

From the above, it should be apparent that the location information database 36 can be populated with logical identifiers (such as IP addresses) and service point locations associated with those logical identifiers.

While the above-described example illustrates one possible technique for populating the location information database 36, it will be appreciated that other techniques may be employed in other embodiments.

It will also be appreciated that, in embodiments where the logical identifier is dynamically assigned to the end-user equipment 12 (e.g., a dynamic IP address), the location information database 36 may be updated accordingly.

Those skilled in the art will appreciate that, in some embodiments, certain functionality of a given component described herein (e.g., the location information server 34 or the transaction validation server 51) may be implemented as pre-programmed hardware or firmware elements (e.g., application specific integrated circuits (ASICs), electrically erasable programmable read-only memories (EPROMs), etc.) or other related elements. In other embodiments, a given component described herein (e.g., the location information server 34 or the transaction validation server 51) may comprise a processor having access to a code memory which stores program instructions for operation of the processor to implement functionality of that given component. The program instructions may be stored on a medium which is fixed, tangible, and readable directly by the given component (e.g., removable diskette, CD-ROM, ROM, fixed disk, USB key, etc.). Alternatively, the program instructions may be stored remotely but transmittable to the given component via a modem or other interface device connected to a network over a transmission medium. The transmission medium may be either a tangible medium (e.g., optical or analog communications lines) or a medium implemented using wireless techniques (e.g., RF, microwave, infrared or other wireless transmission schemes).

Although various embodiments of the present invention have been described and illustrated, it will be apparent to those skilled in the art that numerous modifications and variations can be made without departing from the scope of the invention, which is defined in the appended claims.

The invention claimed is:

1. A method of determining a service point location for use in validating an online transaction, the method comprising:
providing a mapping between service point locations and ports of a network access multiplexer, each service point location having network access provided by a physical link connected to a respective port of the network access multiplexer;
assigning an IP address to end-user equipment connected to a port of the network access multiplexor;
receiving a query IP address;
determining a service point location associated with the query IP address based on the mapping between service point locations and ports of a network access multiplexer and a port the received query IP address is assigned to; and
returning the determined service point location in response to the query IP address.

2. The method of claim 1, further comprising:
providing a mapping between service point locations and IP addresses using the mapping between service point locations and ports and IP addresses assigned to respective ports.

3. The method of claim 2, wherein determining the service point location comprises looking up the query IP address in the mapping between service point locations and IP addresses to determine a service point location mapped to the query IP address.

4. The method of claim 2, wherein providing the mapping between service point locations and IP addresses comprises updating the mapping between service point locations and IP addresses when an IP address assigned to a port is updated.

5. The method of claim 1, wherein providing a mapping between service point locations and ports comprises updating the mapping between service point locations and ports when a service point location assigned to a port is changed.

6. The method of claim 1, wherein the service point location is expressed as a civic address.

7. The method of claim 1, wherein the service point location is expressed as a set of geo-coordinates.

8. An apparatus comprising:
an interface for receiving messages; and
a processing unit coupled to said interface, said processing unit being responsive to receipt of a message at said interface for:
provide a mapping between service point locations and ports of a network access multiplexer, each service point location having network access provided by a physical link connected to a respective port of the network access multiplexer;
assign an IP address to end-user equipment connected to a port of the network access multiplexor;
receive a query IP address;
determine a service point location associated with the query IP address based on the mapping between service point locations and ports of a network access multiplexer and a port the received query IP address is assigned to; and
return the determined service point location in response to the query IP address.

9. The apparatus of claim 8, wherein the processing unit is further responsive to:
provide a mapping between service point locations and IP addresses using the mapping between service point locations and ports and IP addresses assigned to respective ports.

10. The method of claim 9, wherein determining the service point location comprises looking up the query IP address in the mapping between service point locations and IP addresses to determine a service point location mapped to the query IP address.

11. The method of claim 9, wherein providing the mapping between service point locations and IP addresses comprises updating the mapping between service point locations and IP addresses when an IP address assigned to a port is updated.

12. The method of claim 8, wherein providing a mapping between service point locations and ports comprises updating the mapping between service point locations and ports when a service point location assigned to a port is changed.

13. The method of claim 8, wherein the service point location is expressed as a civic address.

14. The method of claim 8, wherein the service point location is expressed as a set of geo-coordinates.

15. A non-transitory computer readable medium having stored thereon instructions which when executed by a processing unit of an apparatus configure the apparatus to perform a method of determining a service point location for use in validating an online transaction, the method comprising:
providing a mapping between service point locations and ports of a network access multiplexer, each service point location having network access provided by a physical link connected to a respective port of the network access multiplexer;

assigning an IP address to end-user equipment connected to a port of the network access multiplexor;

receiving a query IP address;

determining a service point location associated with the query IP address based on the mapping between service point locations and ports of a network access multiplexer and a port the received query IP address is assigned to; and returning the determined service point location in response to the query IP address.

16. The non-transitory computer readable medium of claim 15, wherein the method performed by the apparatus when executing the instructions stored on the non-transitory computer readable medium further comprises:

providing a mapping between service point locations and IP addresses using the mapping between service point locations and ports and IP addresses assigned to respective ports.

17. The non-transitory computer readable medium of claim 16, wherein determining the service point location comprises looking up the query IP address in the mapping between service point locations and IP addresses to determine a service point location mapped to the query IP address.

18. The non-transitory computer readable medium of claim 16, wherein providing the mapping between service point locations and IP addresses comprises updating the mapping between service point locations and IP addresses when an IP address assigned to a port is updated.

19. The non-transitory computer readable medium of claim 15, wherein providing a mapping between service point locations and ports comprises updating the mapping between service point locations and ports when a service point location assigned to a port is changed.

20. The non-transitory computer readable medium of claim 15, wherein the service point location is expressed as a civic address.

21. The non-transitory computer readable medium of claim 15, wherein the service point location is expressed as a set of geo-coordinates.

* * * * *